United States Patent
Takahashi

(10) Patent No.: US 10,257,704 B2
(45) Date of Patent: Apr. 9, 2019

(54) COMMUNICATION APPARATUS AND CONTROL METHOD

(71) Applicant: CANON KABUSHIKI KAISHA, Tokyo (JP)

(72) Inventor: Daiki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/017,773

(22) Filed: Jun. 25, 2018

(65) Prior Publication Data

US 2019/0007833 A1  Jan. 3, 2019

(30) Foreign Application Priority Data

Jun. 30, 2017  (JP) .................. 2017-128954

(51) Int. Cl.
| | |
|---|---|
| H04B 7/00 | (2006.01) |
| H04M 1/00 | (2006.01) |
| H04W 12/06 | (2009.01) |
| H04W 76/14 | (2018.01) |
| H04L 29/12 | (2006.01) |
| H04W 12/04 | (2009.01) |

(52) U.S. Cl.
CPC ......... *H04W 12/06* (2013.01); *H04L 61/6022* (2013.01); *H04W 12/04* (2013.01); *H04W 76/14* (2018.02)

(58) Field of Classification Search
CPC .............. H04B 5/0031; H04M 1/7253; H04M 2250/04; H04W 4/80; H04W 12/06; H04W 12/08; H04W 12/12; H04W 52/0209; H04W 76/10
USPC ......... 455/41.1, 41.2, 41.3, 410, 556.1, 557, 455/566
See application file for complete search history.

(56) References Cited

U.S. PATENT DOCUMENTS

| | | | |
|---|---|---|---|
| 8,910,248 B2 * | 12/2014 | Higuchi | H04L 49/354 370/254 |
| 9,942,422 B2 * | 4/2018 | Nakao | H04N 1/00395 |
| 9,999,077 B2 * | 6/2018 | Sumiuchi | H04W 76/34 |
| 2018/0183977 A1 * | 6/2018 | Takasaki | H04N 1/4413 |
| 2018/0183978 A1 * | 6/2018 | Ishida | H04N 1/4413 |

FOREIGN PATENT DOCUMENTS

JP  2007-228419 A  9/2007

\* cited by examiner

*Primary Examiner* — Quochien B Vuong
(74) *Attorney, Agent, or Firm* — Canon U.S.A., Inc. IP Division

(57) ABSTRACT

A communication apparatus includes a control unit that performs, in a case where a change processing is executed, control such that identification information for identifying an information processing apparatus authenticated as a specific apparatus by authentication processing executed before execution of the change processing is not displayed on a display screen.

20 Claims, 12 Drawing Sheets

FIG. 8

| Service UUID | Service NAME | Characteristic UUID | Characteristic NAME | Service READABLE | Service WRITABLE | Characteristic READABLE | Characteristic WRITABLE | VALUE | PAIRING NECESSITY |
|---|---|---|---|---|---|---|---|---|---|
| 0x180A | Device Information | 0x2A29 | Manufacturer Name String | ○ | | ○ | | Printer Device | |
| | | 0x2A24 | Hardware Revision String | | | ○ | | 1010_AAA | |
| | | 0x2A25 | Firmware Revision String | | | ○ | | 2030000 | |
| | | 0x2A26 | Software Revision String | | | ○ | | 0001 | |
| 00000000-0000-1000-1000-00405f9b34fb | IJ Original | 00000000-0000-2000-1000-00405f9b34fb | SSID | ○ | | ○ | | Printer SSID | ○ |
| | | 00000000-0000-2000-1000-00405f9b34fc | PASSWORD | | | ○ | | aaaabbbb | ○ |
| | | 00000000-0000-2000-1000-00405f9b34fd | SOFTWARE ON COMMAND | | | | ○ | Power On | |
| | | 00000000-0000-2000-1000-00405f9b34fd | NAME AREA | | | | ○ | | |

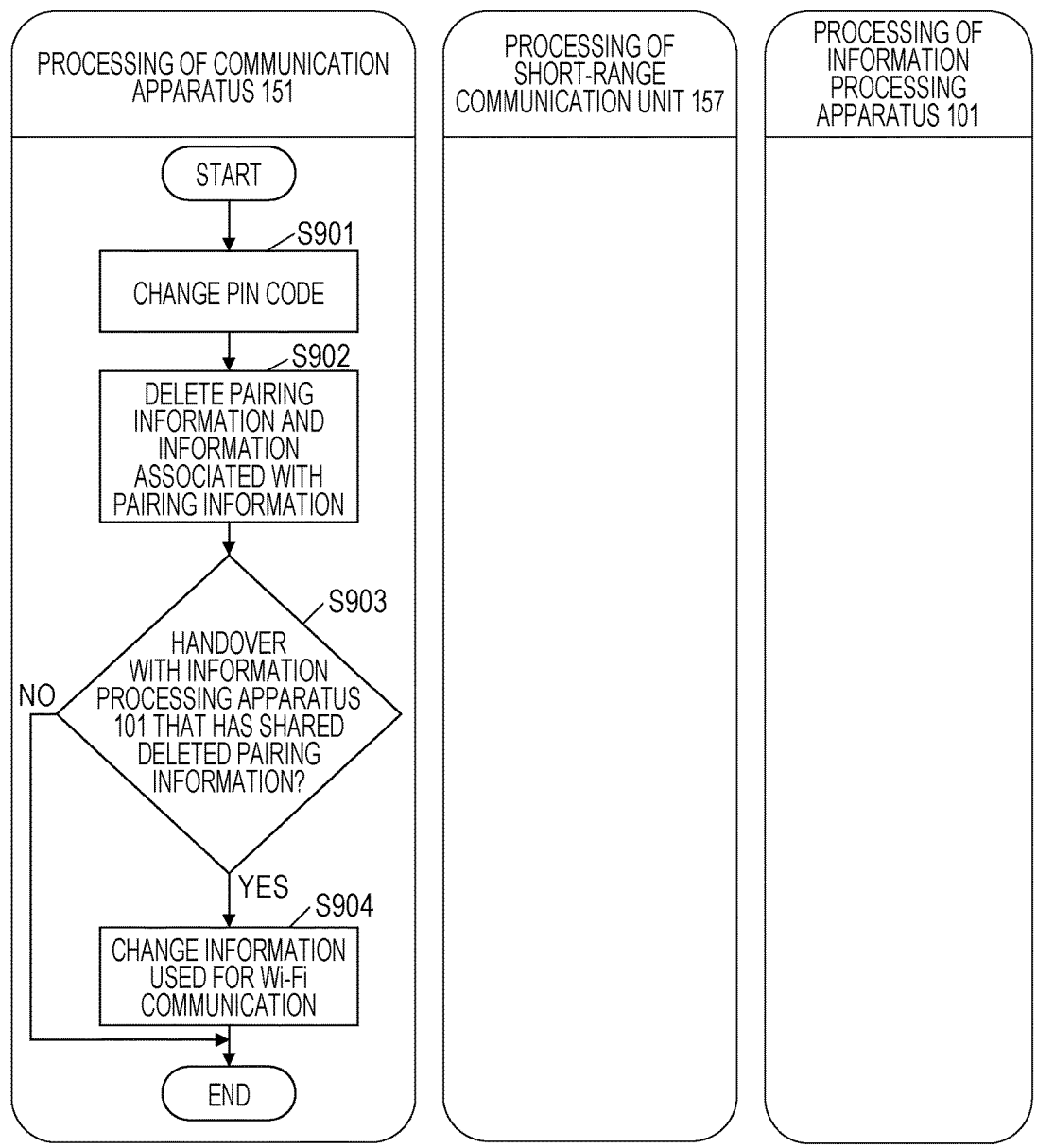

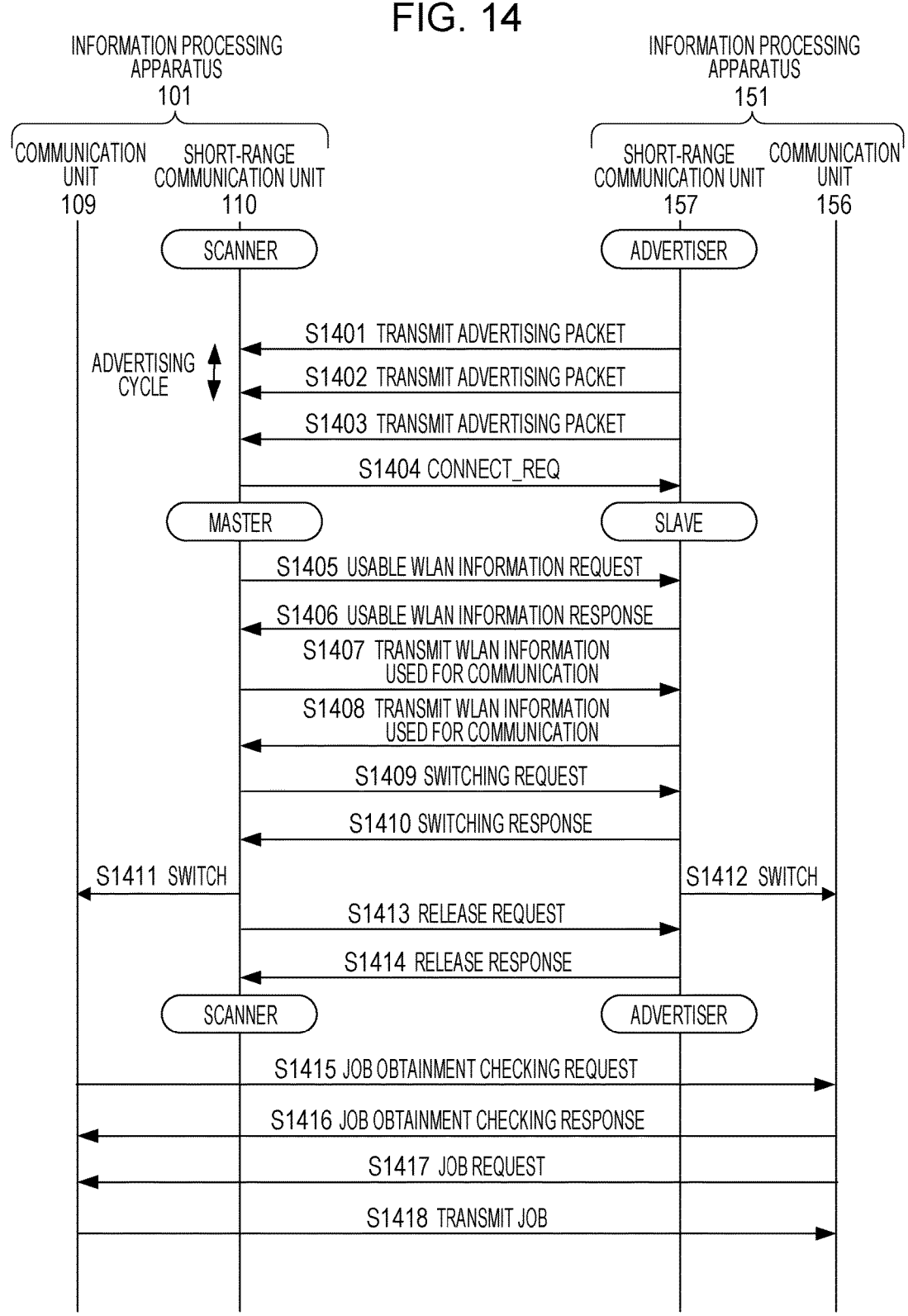

COMMUNICATION APPARATUS AND CONTROL METHOD

BACKGROUND

Field

The present disclosure relates to a communication apparatus and a control method.

Description of the Related Art

A communication system has been proposed in which a communication using a predetermined communication method such as Bluetooth® Low Energy is executed between an information processing apparatus such as a smart phone and a communication apparatus such as a printer. In the above-described communication system, authentication processing (pairing processing) is executed for performing authentication to execute the communication based on the predetermined communication method. Japanese Patent Laid-Open No. 2007-228419 describes a printing apparatus that displays a personal identification number (PIN) code and an information processing apparatus that executes the pairing processing when the PIN code displayed by the printing apparatus is input.

A communication apparatus that displays a display screen including information related to an information processing apparatus already authenticated by authentication processing has been proposed. In addition, a communication apparatus that can execute an operation for returning a state of the information processing apparatus already authenticated by the authentication processing into an unauthenticated state, that is, reset processing for resetting the already executed authentication processing has been proposed. In a case where the information related to the information processing apparatus is not appropriately processed when the reset processing is executed, the information related to the information processing apparatus that is unnecessary for a user remains on the display screen displayed after the reset, and there is a possibility that user's convenience can be degraded.

SUMMARY

In view of the above, an aspect of the present disclosure displays a display screen where the user's convenience is high in a case where the reset processing is executed.

According to an aspect of the present disclosure, a communication apparatus includes a communication unit configured to perform a communication based on a predetermined communication method, an authentication unit configured to execute authentication processing for authenticating an information processing apparatus by using authentication information as a specific apparatus that is permitted to perform a predetermined communication with the communication apparatus based on the predetermined communication method, wherein the authentication processing is executed based on specifications of the predetermined communication method, a display unit configured to display a display screen including identification information for identifying the information processing apparatus authenticated by the authentication processing as the specific apparatus, wherein the identification information is not information set to be obtained by the communication apparatus in the authentication processing based on the specifications of the predetermined communication method, an execution unit configured to execute change processing for changing contents of the authentication information, and a control unit configured to perform, in a case where the change processing is executed, control such that the identification information for identifying the information processing apparatus authenticated as the specific apparatus by the authentication processing executed before the execution of the change processing is not included in the display screen.

According to another aspect of the present disclosure a communication apparatus includes a communication unit configured to perform a communication based on a predetermined communication method, an authentication unit configured to perform authentication processing for authenticating an information processing apparatus as a specific apparatus that is permitted to perform a predetermined communication based on the predetermined communication method with the communication apparatus by using authentication information, wherein the authentication processing is executed by using specifications of the predetermined communication method, a display unit configured to display a display screen including identification information obtained from the information processing apparatus authenticated as the specific apparatus by the authentication processing, wherein the identification information is not information set to be obtained by the communication apparatus in the authentication processing based on the specifications of the predetermined communication method, an execution unit configured to execute change processing for changing contents of the authentication information, a control unit configured to perform, in a case where the change processing is executed, control such that the identification information for identifying the information processing apparatus authenticated as the specific apparatus by the authentication processing executed before the execution of the change processing is not included in the display screen, and an image forming unit configured to form an image on a recording medium.

Further features will become apparent from the following description of exemplary embodiments with reference to the attached drawings.

BRIEF DESCRIPTION OF THE DRAWINGS

FIG. 8 is a table illustrating an example of GATT data saved in the short-range communication unit.

FIG. 9 is a flow chart illustrating the processing when the communication apparatus changes the PIN code.

FIG. 14 is a sequence chart in a case where the information processing apparatus and the communication apparatus perform handover on the basis of a Bluetooth® Low Energy communication method.

DESCRIPTION OF THE EMBODIMENTS

Hereinafter, exemplary embodiments will be described for illustrative purposes. It should be noted however that, it is to be understood that configurations obtained by making alterations and modifications to the following exemplary embodiments are also included in the scope of the present disclosure without departing from the scope of the disclosure based on ordinary knowledge of the skilled in the art.

First Exemplary Embodiment

An information processing apparatus and a communication apparatus included in a communication system according to the present exemplary embodiment will be described. According to the present exemplary embodiment, a smart phone is exemplified as the information processing apparatus, but the configuration is not limited to this, and the present exemplary embodiment can be applied to various apparatuses such as a mobile terminal, a laptop personal computer (PC), a tablet terminal, a personal digital assistant (PDA), and a digital camera. In addition, a printer is exemplified as the communication apparatus according to the present exemplary embodiment, but the configuration is not limited to this, and the present exemplary embodiment can be applied to various apparatuses as long as the apparatuses can wirelessly communicate with the information processing apparatus. For example, in case of printers, the present exemplary embodiment can be applied to an inkjet printer, a full-color laser beam printer, a monochrome printer, and the like. In addition, the present exemplary embodiment can be applied to not only the printers but also a copier, a facsimile (FAX) apparatus, a mobile terminal, a smart phone, a laptop PC, a tablet terminal, a PDA, a digital camera, a music player device, a television set, a smart speaker, and the like. Moreover, the present exemplary embodiment can also be applied to a multi-functional peripheral provided with a plurality of functions including a copier function, a FAX function, and a printing function.

Figure 1:
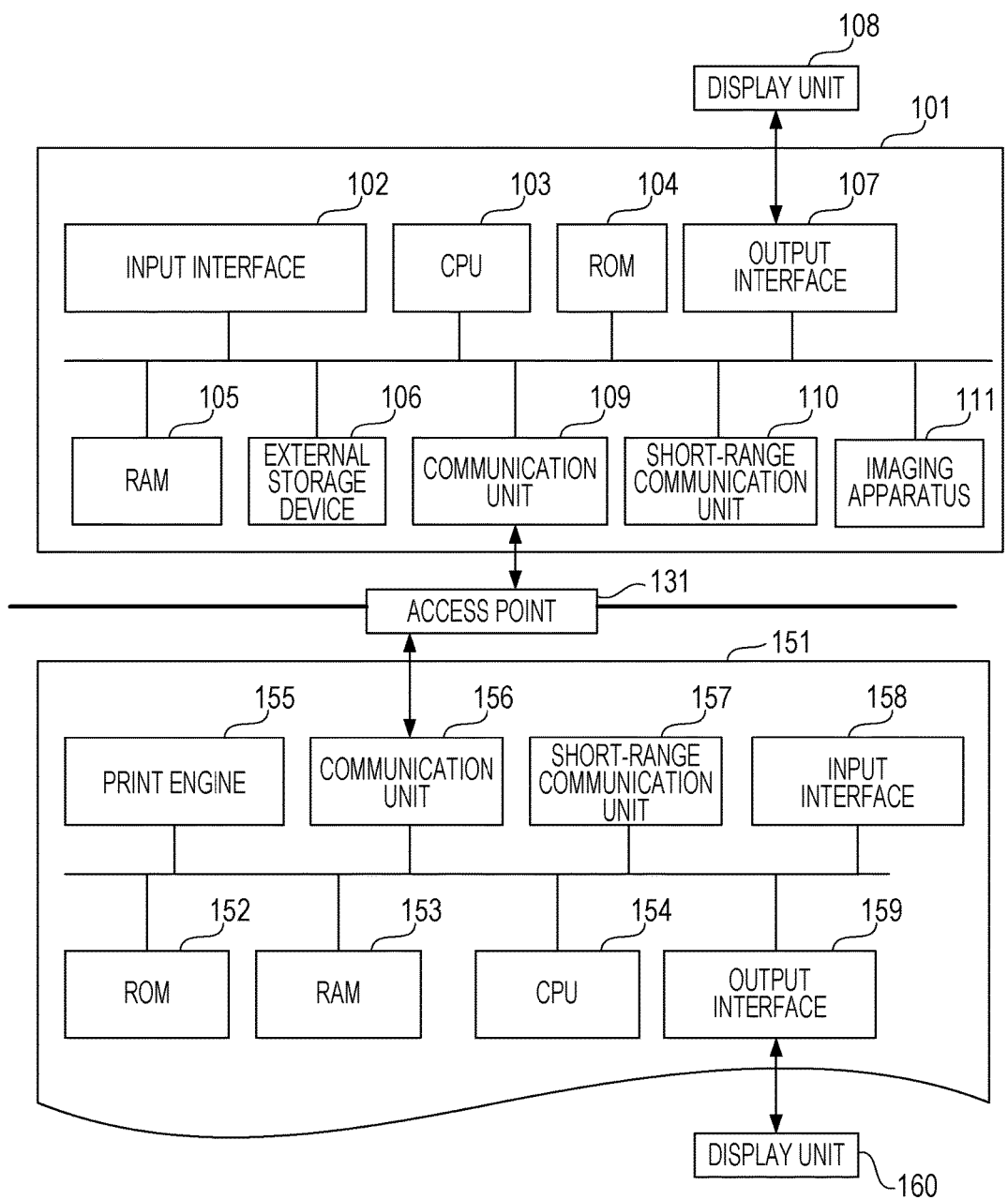
FIG. 1 illustrates configurations of an information processing apparatus and a control apparatus.

First, the information processing apparatus according to the present exemplary embodiment and the communication apparatus that can communicate with the information processing apparatus according to the present exemplary embodiment will be described with reference to the block diagram of FIG. 1. In addition, the following configuration will be described as an example according to the present exemplary embodiment, but the present exemplary embodiment can be applied to the apparatus that can communicate with the communication apparatus, and the functions are not particularly intended to be limited to this illustration.

An information processing apparatus 101 is an information processing apparatus according to the present exemplary embodiment. The information processing apparatus 101 includes hardware configuration units such as an input interface 102, a CPU 103, a ROM 104, a RAM 105, an external storage device 106, an output interface 107, a display unit 108, a communication unit 109, a short-range communication unit 110, and an imaging apparatus 111.

The input interface 102 is an interface configured to accept a data input and an operation instruction from a user via a physical key board, a button, a touch panel, or the like.

The CPU 103 is a system control unit and controls the entirety of the information processing apparatus 101.

The ROM 104 stores fixed data such as control programs executed by the CPU 103, a data table, an embedded operating system (hereinafter, referred to as an OS), and programs. According to the present exemplary embodiment, the respective control programs stored in the ROM 104 perform software execution control such as scheduling, task switch, or interruption processing under management of the embedded OS stored in the ROM 104.

The RAM 105 is constituted by a static random access memory (SRAM) or the like that uses a backup power source. It should be noted that data is held in the RAM 105 by a primary battery for data backup which is not illustrated in the drawing, and it is possible to store the important data such as program control variables without being volatilized. In addition, a memory area for storing setting information of the information processing apparatus 101, management data of the information processing apparatus 101, and the like is also prepared in the RAM 105. The RAM 105 is also used as a main memory of the CPU 103 and a work memory.

The external storage device 106 is provided with an application for providing a printing execution function (hereinafter, referred to as a printing application). The external storage device 106 is also provided with various programs including a printing information generation program for generating printing information that can be interpreted by a communication apparatus 151 and an information transmission and reception control program for performing transmission and reception with the communication apparatus 151 connected via the communication unit 109. Various pieces of information used by these programs are saved in the external storage device 106. In addition, image data obtained from the other information processing apparatus or the internet via the communication unit 109 is saved in the external storage device 106.

The output interface 107 is an interface configured to perform control for the display unit 108 to perform display of the data and notification of a state of the information processing apparatus 101.

The display unit 108 is constituted by a light emitting diode (LED), a liquid crystal display, or the like and performs the display of the data and the notification of the state of the information processing apparatus 101. It should be noted that the display unit 108 may also be constituted by a touch panel. In this case, an input from the user may also be accepted via the display unit 108 while the information processing apparatus 101 causes the display unit 108 to display a soft keyboard provided with keys including a numeral value input key, a mode setting key, an enter key, a cancel key, and a power key.

The communication unit 109 has a configuration for executing a data communication by being connected to an apparatus such as the communication apparatus 151. For example, the communication unit 109 can be connected to an access point (not illustrated) in the communication apparatus 151. When the communication unit 109 is connected to the access point in the communication apparatus 151, the information processing apparatus 101 and the communication apparatus 151 can communicate with each other. It should be noted that the communication unit 109 can directly communicate with the communication apparatus 151 by the wireless communication or communicate with the communication apparatus 151 via an external access point (access point 131) existing outside the information processing apparatus 101 and the communication apparatus 151. For example, Wireless Fidelity (Wi-Fi®), Classic Bluetooth®, or the like is used as the wireless communication method. A device such as a wireless LAN router is used as the access point 131, for example. It should be noted that a method for the information processing apparatus 101 and the communication apparatus 151 to establish a direct connection without the intermediation of the external access point is referred to as a direct connection method according to the present exemplary embodiment. On the other hand, a method for the information processing apparatus 101 and the communication apparatus 151 to establish a connection via the external access point is referred to as an infrastructure connection method. In addition, the communication unit 109 may be provided with hardware that functions as the access point or may also operate as the access point on the basis of software for functioning as the access point. The communication unit 109 uses this access point to perform the connection based on the direct connection method. According to the present exemplary embodiment, the communication unit 109 can also perform a communication in a longer range and at a higher speed than the communication executed by the short-range communication unit 110 (short-range wireless communication).

The short-range communication unit 110 has a configuration for executing a data communication by being wirelessly connected to an apparatus such as the communication apparatus 151 in a short range and performs a communication by a communication method different from that of the communication unit 109. The short-range communication unit 110 can be connected to a short-range communication unit 157 in the communication apparatus 151. It should be noted that, according to the present exemplary embodiment, Bluetooth® Low Energy is used as the communication method for the short-range communication unit 110. For this reason, the short-range communication unit 110 communicates with the other short-range communication unit on the basis of a GATT (Generic Attribute Profile) communication defined by Bluetooth® Low Energy specifications. It should be noted that the communication method used by the short-range communication unit 110 is not limited to Bluetooth® Low Energy. For example, other communication methods such as a near field communication (NFC) and Wi-Fi Aware™ may also be used.

The imaging apparatus 111 is an apparatus configured to convert an image imaged by imaging elements into digital data. The digital data is stored once in the RAM 105. Thereafter, the digital data is converted into a predetermined image format by a program executed by a CPU 154 and saved in the external storage device 106 as image data.

A ROM 152 stores fixed data such as control programs executed by the CPU 154, a data table, and an OS program.

The communication apparatus 151 is a communication apparatus according to the present exemplary embodiment. The communication apparatus 151 includes the ROM 152, a RAM 153, the CPU 154, a print engine 155, a communication unit 156, the short-range communication unit 157, an input interface 158, an output interface 159, a display unit 160, and the like.

The communication unit 156 includes an access point for establishing a connection to an apparatus such as the information processing apparatus 101 as an access point inside the communication apparatus 151. It should be noted that the access point can be connected to the communication unit 109 of the information processing apparatus 101. It should be noted that the communication unit 156 may directly communicate with the information processing apparatus 101 by way of the wireless communication or may also communicate with the information processing apparatus 101 via the access point 131. For example, Wi-Fi®, Classic Bluetooth®, or the like is exemplified as the communication method. The communication unit 156 may be provided with hardware that functions as the access point or may also operate as the access point on the basis of software for functioning as the access point.

The RAM 153 is constituted by a DRAM or the like that uses the backup power source. It should be noted that, since the data is held in the RAM 153 while the power for the data backup which is not illustrated in the drawing is supplied, it is possible to store the important data such as the program control variables without being volatilized. The RAM 153 is also used as a main memory of the CPU 154 and a work memory and saves reception buffers for temporarily saving the printing information received from the information processing apparatus 101 or the like and various pieces of information.

The ROM 152 stores the fixed data such as the control programs executed by the CPU 154, the data table, and the OS program. According to the present exemplary embodiment, the respective control programs stored in the ROM 152 perform software execution control processes such as scheduling, task switch, and interruption processing under management of the embedded OS stored in the ROM 152. In addition, a memory area for storing data such as setting information of the communication apparatus 151 or management data of the communication apparatus 151 which needs to be held even in a case where the power is not supplied is prepared in the ROM 152.

The CPU 154 is a system control unit and controls the entirety of the communication apparatus 151.

An image is formed on a recording medium such as paper by using a recording agent such as ink on the basis of the information saved in the print engine 155 and the RAM 153 or the printing information received from the information processing apparatus 101 or the like, and a printing result is output. At this time, the printing information transmitted from the information processing apparatus 101 or the like has a large transmission data amount and demands a high speed communication. Therefore, the printing information is received via the communication unit 156 that can perform the communication at a speed higher than that of the short-range communication unit 157.

The input interface 158 is an interface for accepting a data input and an operation instruction from a user and is constituted by a physical key board, a button, a touch panel, or the like. It should be noted that a mode may be adopted in which the output interface 159 which will be described below and the input interface 158 have the same configuration, and the output of the screen and the acceptance of the operation from the user are performed by the same configuration. The output interface 159 is an interface for performing a control for the display unit 160 to display the data and perform a notification of a state of the communication apparatus 151.

The display unit 160 is constituted by a light emitting diode (LED), a liquid crystal display, or the like and performs display of data and the notification of the state of the communication apparatus 151. It should be noted that, when a soft keyboard provided with keys including a numeral value input key, a mode setting key, an enter key, a cancel key, and a power key are installed on the display unit 160, an input from the user may also be accepted via the display unit 160.

The short-range communication unit 157 has a configuration for executing a data communication by being wirelessly connected to an apparatus such as the information processing apparatus 101 in a short range and performs the communication by a communication method different from that of the communication unit 156. The short-range communication unit 157 can be connected to the short-range communication unit 110 in the information processing apparatus 101. It should be noted that Bluetooth® Low Energy is used as the communication method for the short-range communication unit 157 according to the present exemplary embodiment. For this reason, the short-range communication unit 157 communicates with the other short-range communication unit by the GATT communication defined by the Bluetooth® Low Energy specifications. It should be noted that the communication method used by the short-range communication unit 157 is not limited to Bluetooth® Low Energy. For example, the other communication methods such as NFC and Wi-Fi Aware™ may also be used.

Figure 2:
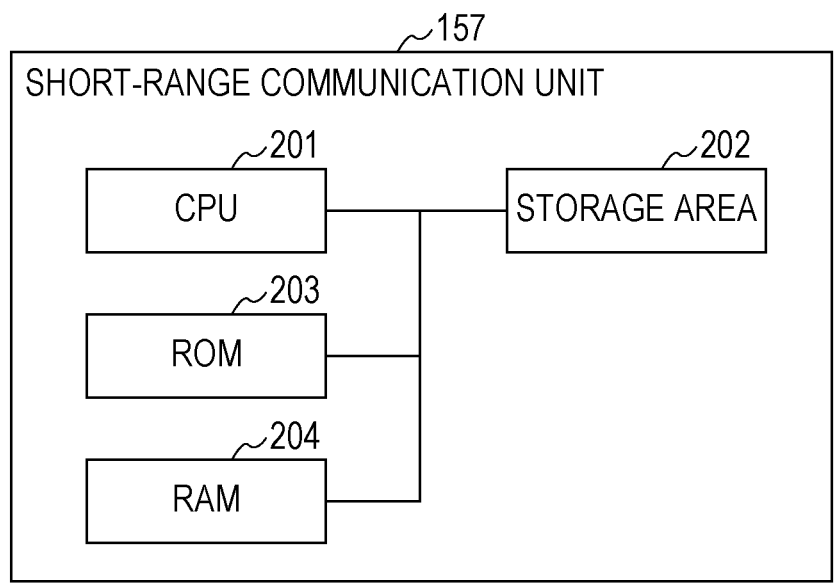
FIG. 2 is a block diagram illustrating a detailed configuration of a short-range communication unit.

A detail of the short-range communication unit 157 is illustrated in FIG. 2. The short-range communication unit 157 and the CPU 154 perform the communication via a bus interface such as I2C. The short-range communication unit 157 includes a CPU 201, a storage area 202, a ROM 203, and a RAM 204. The storage area 202 is a storage area where an access can be accepted from the CPU 154. In the storage area 202, an access can also be accepted from the information processing apparatus 101 via the short-range communication unit 110. The RAM 204 is constituted by a DRAM or the like that uses a backup power source. It should be noted that, since the data is held in the RAM 204 while the power for the data backup which is not illustrated in the drawing is supplied, it is possible to store the important data such as the program control variables without being volatilized. The RAM 204 is also used as a main memory of the CPU 201 and a work memory. The ROM 203 stores fixed data such as control programs executed by the CPU 201, a data table, and an OS program. It should be noted that the short-range communication unit 110 may also have a configuration similar to the short-range communication unit 157.

A memory such as an external HDD or an SD card may be attached to the communication apparatus 151 as an optional device, and information saved in the communication apparatus 151 may also be saved in the above-described memory.

Herein, the above-described process sharing has been adopted between the information processing apparatus 101 and the communication apparatus 151 as an example, but the configuration is not particularly limited to this process sharing, and another mode may also be adopted.

According to the present exemplary embodiment, the short-range communication unit 157 functions as an advertiser (or a slave) that broadcasts advertising information which will be described below, and the short-range communication unit 110 functions as a scanner (or a master) that receives the advertising information.

Herein, processing for the transmission of the advertising information and processing for the reception of the starting request of the GATT communication in the Bluetooth® Low Energy specifications will be described. According to the present exemplary embodiment, the short-range communication unit 157 performs the above-described processing for the short-range communication unit 157 to function as the slave device as described above.

Figure 11:
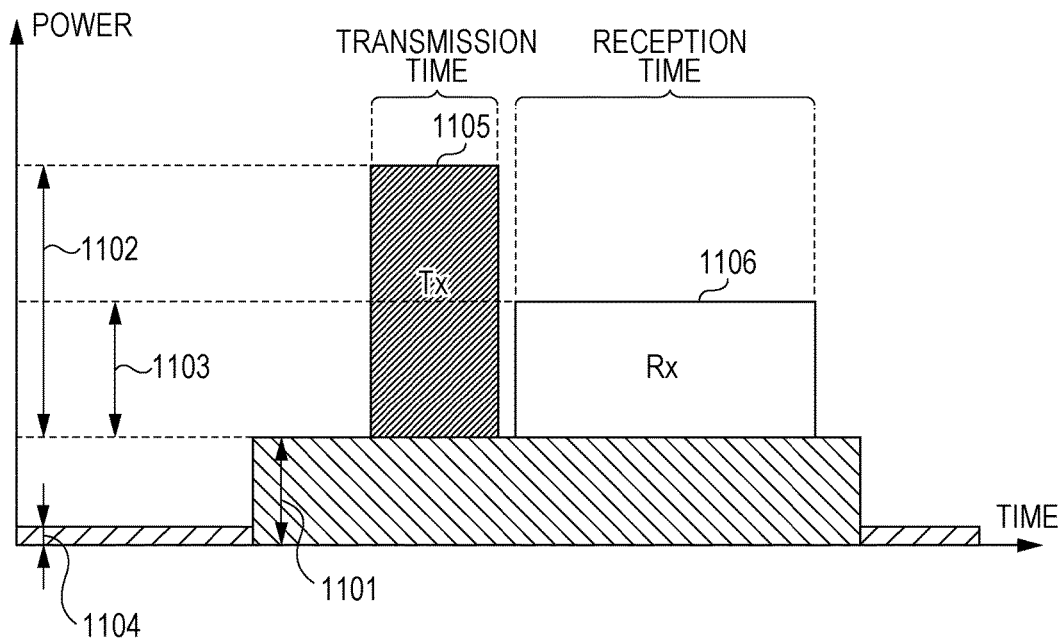
FIG. 11 illustrates power consumption of the short-range communication unit.

The short-range communication unit 157 performs the communication by dividing a frequency band of 2.4 GHz into 40 channels (0 to 39 ch). Among those channels, the short-range communication unit 157 uses the 37-th to 39-th channels for the transmission of the advertising information and the reception of the starting request of the GATT communication and uses the 0-th to 36-th channels for data communication (GATT communication) after the Bluetooth® Low Energy connection. In FIG. 11, the vertical axis indicates the power consumption of the short-range communication unit 157, and the horizontal axis indicates the power consumption when the advertising information is transmitted by using a single channel for each processing. Tx 1105 indicates total power consumption in the transmission processing corresponding to processing for broadcasting the advertising information, and Rx 1106 indicates total power consumption in the reception processing corresponding to processing for enabling a receiver configured to receive the starting request of the GATT communication. Transmission power 1102 indicates instantaneous power consumption by the transmission processing. Reception power 1103 indicates the instantaneous power consumption by the reception processing. Microcomputer operating power 1101 indicates instantaneous power consumption in a case where a microcomputer in the short-range communication unit 157 operates. It should be noted that a reason why the microcomputer operates before, after, and between Tx 1105 and Rx 1106 is that the microcomputer needs to be activated in advance for execution and stopping of the transmission and reception processing. In a case where the transmission of the advertising information is performed in a plurality of channels, the power consumption increases in accordance with the number of channels in which the transmission of the advertising information is performed. While the short-range communication unit 157 is in a power saving state when the microcomputer does not operate, sleep power 1104 corresponds to the instantaneous power consumption of the short-range communication unit 157. It should be noted that the sleep power 1104 is power consumed by the short-range communication unit 157 in a power saving time in FIG. 12 which will be described below. In this manner, after the short-range communication unit 157 performs the transmission processing by using a predetermined channel, the short-range communication unit 157 performs the reception processing for a certain period of time by using the same channel to wait for the transmission of the starting request of the GATT communication from the information processing apparatus 101.

Figure 12:
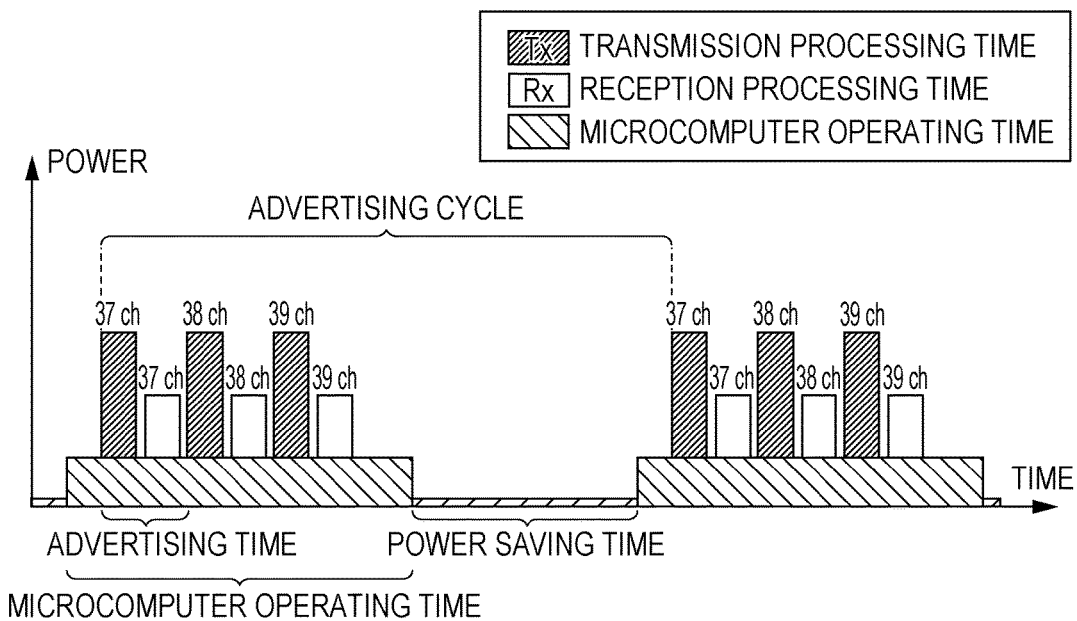
FIG. 12 illustrates transmission processing and reception processing of advertising information by the short-range communication unit.

As illustrated in FIG. 12, the short-range communication unit 157 repeats the transmission processing and the reception processing of the advertising information three times for each channel and then stops the operation of the microcomputer to enter the power saving state for a certain period of time. Hereinafter, a combination of the transmission processing and the reception processing of the advertising information in the predetermined channel will be referred to as an advertising. A time cycle for transmitting the advertising information in the predetermined channel will be referred to as an advertising cycle. In this manner, since the short-range communication unit 157 enters the power saving state for every advertising cycle, it is possible to continue the operation while the power consumption is suppressed. It should be noted that the number of times to repeat the advertising until the power saving state is established after the advertising is performed for the first time can be arbitrarily changed as long as the number of times is 3 or less.

Figure 13:
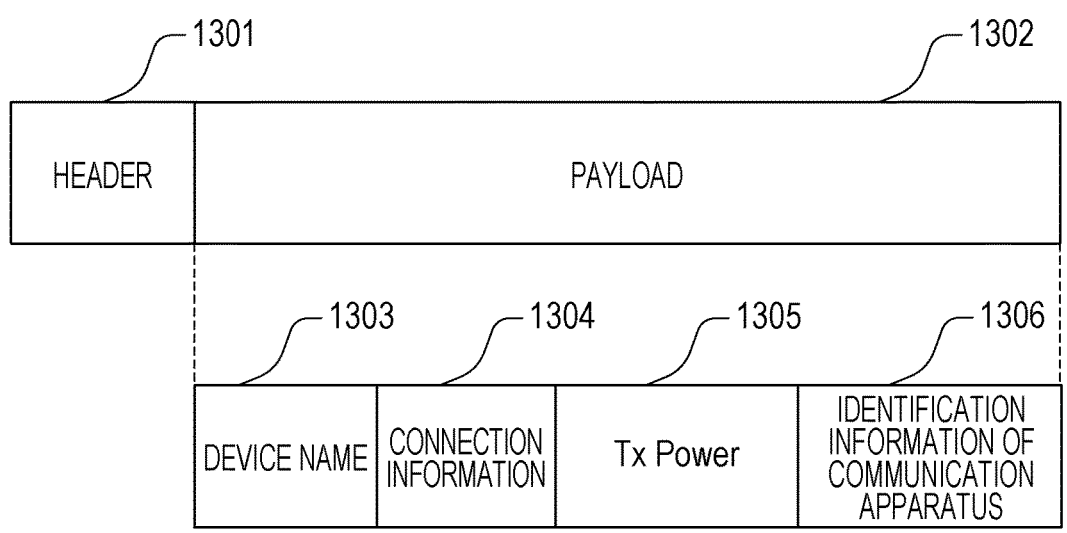
FIG. 13 illustrates an example of a structure of the advertising information that is broadcast by the short-range communication unit to the surrounding of the communication apparatus.

FIG. 13 illustrates an example of a structure of advertising information that is broadcast by the short-range communication unit 157 to the surrounding of the communication apparatus 151.

The short-range communication unit 157 performs initialization processing when power supply is started and enters an advertising state. When the short-range communication unit 157 enters the advertising state, the short-range communication unit 157 regularly broadcasts the advertising information to the surrounding on the basis of the advertising cycle. The advertising information refers to a signal including basic header information (such as identification information for identifying an apparatus that transmits this advertising information) and is constituted by a header 1301 and a payload 1302. When the information processing apparatus 101 receives this advertising information, it is possible to recognize the presence of the communication apparatus 151. Furthermore, when the information processing apparatus 101 transmits the starting request of the GATT communication to the communication apparatus 151, it is possible to establish the Bluetooth® Low Energy connection to the communication apparatus 151. The header 1301 is an area for storing information such as a type of the advertising information or a size of the payload 1302 or the like. The payload 1302 stores information such as a device name 1303, mounting profile information as the identification information, connection information 1304 for connecting the communication apparatus 151 and the Bluetooth® Low Energy connection to each other, and transmission power of the advertising information (Tx Power) 1305. It should be noted that identification information 1306 of the communication apparatus may be included in the advertising information. The identification information 1306 of the communication apparatus includes a MAC address of the communication apparatus, service information of the communication apparatus, an SSID of the access point in the communication apparatus, a password, or the like. It should be noted that the advertising information may also include various pieces of information other than the above-described information.

Herein, an outline of Generic Attribute Profile (GATT) communication in the Bluetooth® Low Energy specifications will be described. GATT refers to a profile that governs read and write (transmission and reception) of the information in the Bluetooth® Low Energy specifications.

In the GATT communication, two roles including a GATT client and a GATT server are defined on the basis of a transfer source and a transfer destination of the data.

The GATT client transmits a request to the GATT server and receives a response from the GATT server. According to the present exemplary embodiment, the information processing apparatus 101 becomes the GATT client. The GATT client can execute a reading operation (read) of the information held in the storage area of the short-range communication unit of the GATT server and a writing operation (write) of the information with respect to this storage area.

When the GATT server receives the request from the GATT client, the GATT server returns a response to the GATT client. According to the present exemplary embodiment, the communication apparatus 151 becomes the GATT server. It should be noted that the GATT server operates as a device that stores information such as status information of the GATT server.

Figure 3:
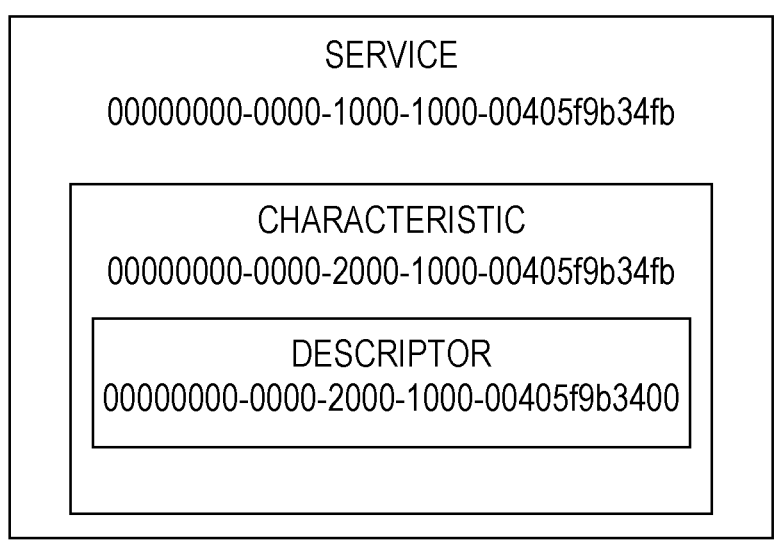
FIG. 3 illustrates a data format of GATT.

Next, a GATT data format will be described. The GATT data has a hierarchal structure as illustrated in FIG. 3 and is constituted by three elements which are so-called service, characteristic, and descriptor. It should be noted however that it is also sufficient if the descriptor does not exist, and the descriptor does not exist in the GATT data constituted by the short-range communication unit 157 according to the present exemplary embodiment. The service, the characteristic, and the descriptor can be identified by a universally unique identifier (UUID) represented by 32 digits. The UUID mentioned herein is used as the identifier for uniquely identifying an object on software. The UUID is a 128-bit numeric value but is normally represented by a hexadecimal form like 550e8400-e29b-41d4-a716-446655440000. It should be noted that the service, the characteristic, and the descriptor include ones defined by standards of Bluetooth® SIG, vendor-specific ones, and the like. The UUID of the vendor-specific service, characteristic, or descriptor is represented by 32 digits as described above, and the UUID of the service, characteristic, or descriptor defined by the standards of Bluetooth® SIG is represented by 4 digits. That is, for example, the UUID of the service, characteristic, or descriptor defined by the standards of Bluetooth® SIG is represented like 2A49.

The service is a subset of attributions in the GATT data for each common classification, and each of the services includes one or more characteristics. With regard to the characteristic, a single value is set for each characteristic. With regard to the descriptor, an attribute value is set used when additional information is needed for the characteristic. It is possible to respectively set attributes of read and write corresponding to setting values indicating whether or not read and write are permitted to the GATT client in the service, the characteristic, and the descriptor.

When the GATT client specifies the UUID of each of the service and the characteristic, read and write can be executed with respect to the value set in the specified characteristic. It should be noted however that whether or not read and write can be executed is based on the read and write attributes set in each of the services and the characteristic.

According to the present exemplary embodiment, pairing processing for performing authentication between the short-range communication unit included in the respective apparatuses and executing read and write of the specific data by the GATT communication is executed between the apparatuses. The pairing processing, in other words, the GATT communication refers to a communication in which the information processing apparatus 101 plays the role of the GATT client and the communication apparatus 151 plays the role of the GATT server, and read and write of the information from the information processing apparatus 101 to the communication apparatus 151 are performed by the GATT-base profile. The communication apparatus 151 has a configuration in which read and write of the specific information by the GATT communication are not permitted in a state in which the pairing between the information processing apparatus 101 and the communication apparatus 151 is not executed. That is, in an unpaired state, read and write with respect to a pairing unnecessary area can be performed, but read and write with respect to a pairing necessary area are not performed. It should be noted that read and write with respect to both the pairing necessary area and the pairing unnecessary area can be performed in a paired state. When the above-described configuration is adopted, it is possible to suppress a possibility that the information processing apparatus 101 and the communication apparatus 151 which have not been paired perform the communication, and the information held by the communication apparatus 151 is unintendedly obtained by the unpaired information processing apparatus 101, for example. It should be noted that the respective characteristics included in the GATT data are one in which read and write are not performed unless it is already paired (pairing necessary area) and one in which read and write can be performed even when it is not already paired (pairing unnecessary area).

Figure 4:
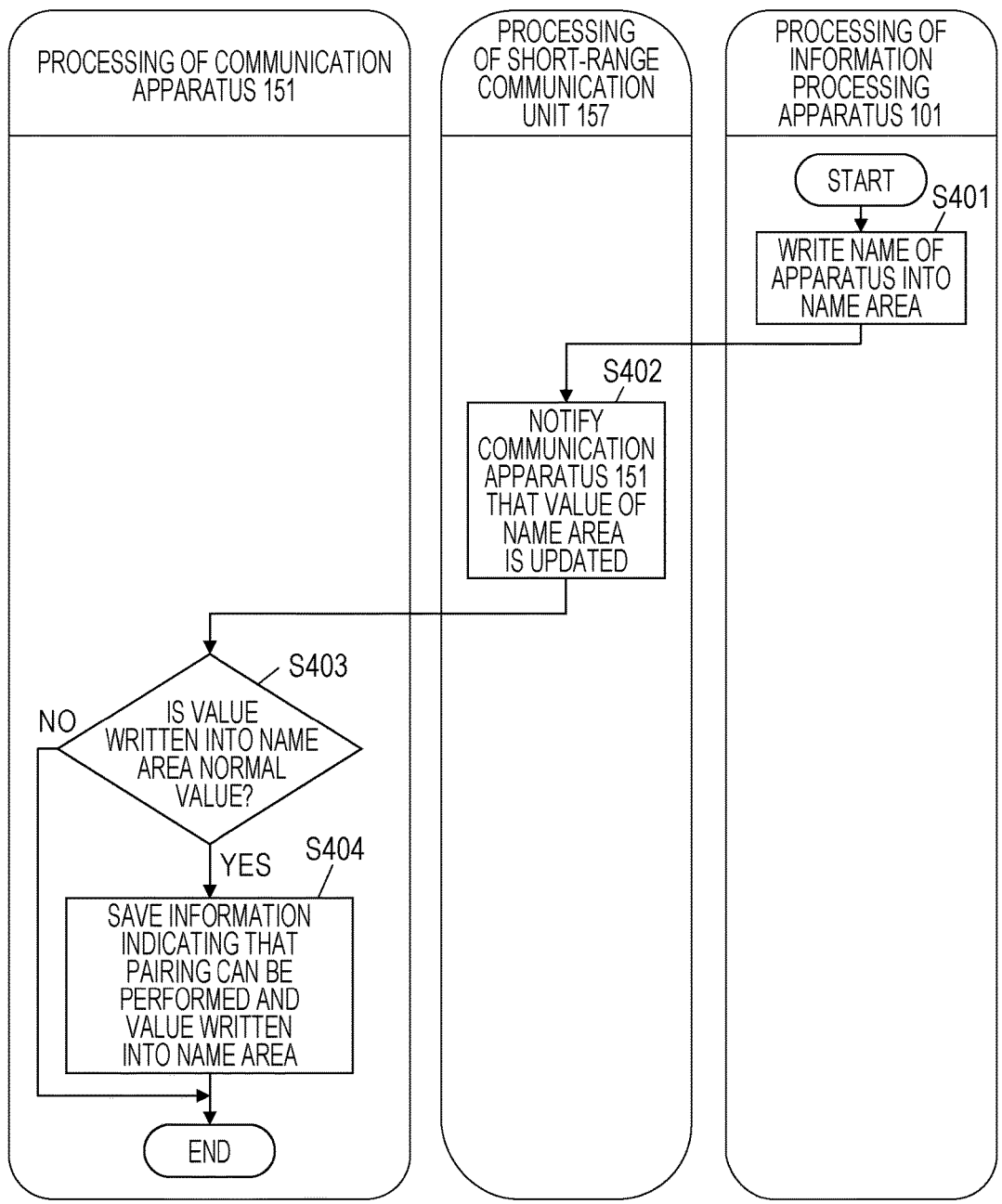
FIG. 4 is a flow chart illustrating processes executed by respective apparatuses before pairing processing is started.

FIG. 4 illustrates processing when the communication apparatus 151 and the information processing apparatus 101 perform the processing via the short-range communication unit 157 and the short-range communication unit 110. In addition, FIG. 4 is a flow chart illustrating processes executed by the respective apparatuses before the pairing processing is started. It should be noted that, in the flow chart of FIG. 4, the processing executed by each of the apparatuses is realized when the CPU of each of the apparatuses develops the various programs stored in the storage area of each of the apparatuses into the RAM of each of the apparatuses and executes the developed programs in actuality. It should be noted that, for example, the processing executed by the short-range communication unit 157 may be controlled by the CPU included in the communication apparatus 151, and the processing executed by the short-range communication unit 110 may be controlled by the CPU included in the information processing apparatus 101. The processing from S401 in the flow chart of FIG. 4 is started, for example, in a case where the operation for executing the communication with the communication apparatus 151 is performed via a predetermined application (such as a printing application) or the like installed in the information processing apparatus 101. It should be noted that the operation for executing the communication with the communication apparatus 151 is an operation for pressing a predetermined button on a screen displayed by a predetermined application or the like installed in the information processing apparatus 101, or the like. In addition, the processing from S401 in the flow chart of FIG. 4 is started in a state in which the short-range communication unit 157 and the short-range communication unit 110 establish the Bluetooth® Low Energy connection, and the GATT communication can be executed.

In S401, the information processing apparatus 101 performs a write request to the short-range communication unit 157 via the short-range communication unit 110 and performs write into the specific area of the GATT data constituted by the short-range communication unit 157.

FIG. 8 illustrates an example of the GATT data constituted by the short-range communication unit 157. In the GATT data of FIG. 8, "Service UUID" indicates a UUID allocated to each of the services. "Service name" indicates a name of each of the services. "Characteristic UUID" indicates a UUID allocated to each of the characteristics. "Characteristic name" indicates a name of each of the characteristics. "Service readable" indicates whether or not a value related to each of the services can be read by the information processing apparatus 101. "Service writable" indicates whether or not a value related to each of the services can be written by the information processing apparatus 101. "Characteristic readable" indicates whether or not a value related to each of the characteristics can be read by the information processing apparatus 101. "Characteristic writable" indicates whether or not a value related to each of the characteristics can be written by the information processing apparatus 101. "Pairing necessity" indicates whether or not the information processing apparatus 101 is not permitted to perform write or read of a value related to each of the characteristics unless already paired. The information processing apparatus 101 can read the value related to the corresponding characteristic in a case where "service readable" indicates readable (◯) and also "characteristic readable" indicates readable (◯). The information processing apparatus 101 does not read the value related to the corresponding characteristic in a case where "Service readable" indicates readable (◯) and also "characteristic readable" indicates not readable (blank). "Value" indicates a value set in each of the characteristics. In a case where "pairing necessity" indicates pairing unnecessary (blank), the information processing apparatus 101 can read and write the value related to the corresponding characteristic even in an unpaired state with the communication apparatus 151. On the other hand, in a case where "pairing necessity" indicates pairing necessary (◯), the information processing apparatus 101 does not read or write the value related to the corresponding characteristic unless being in the paired state with the communication apparatus 151.

The specific area where write is performed in S401 is set as the characteristic of "name area" according to the present exemplary embodiment. "Name area" refers to an area where a name of the apparatus (herein, the information processing apparatus 101) that performs the write with respect to the GATT data of FIG. 8 is written by this apparatus. It should be noted that the name area is an accessible area even in the unpaired state with the communication apparatus 151 as illustrated in FIG. 8. At this time, the information processing apparatus 101 writes the name of the information processing apparatus 101 into the name area in conformity to a previously determined specific rule. The specific rule is, for example, a rule related to a data format, an encryption method, a character string, or a data size. It should be noted that the specific rule is recognized by the printing application, for example, and a correct value in conformity to the specific rule is written when the present processing is performed by using the printing application corresponding to the communication apparatus 151.

In S402, the short-range communication unit 157 detects that the write into the name area has been executed in S401 and notifies the communication apparatus 151 (or the CPU 154 of the communication apparatus 151) of the execution of the write into the name area. A configuration for notifying of the execution of the write into the name area may be a configuration in which the short-range communication unit 157 causes the CPU 154 to generate an interruption or a configuration in which the CPU 154 polls a state of the short-range communication unit 157.

In S403, the communication apparatus 151 determines whether or not the value written into the name area in S401 is a normal value. According to the present exemplary embodiment, this determination is executed by determining whether or not the value in conformity to the above-described specific rule is written. It should be noted however that a method other than the above-described method may be used for this determination. For example, the value written into the name area may be determined as the normal value in a case where a value previously input to the communication apparatus 151 via the input interface 158 is matched with the value written into the name area. Herein, a plurality of values may be previously input to the communication apparatus 151 via the input interface 158. The value written into the name area may also be determined as the normal value when the write into the specific area of the GATT data is performed. In a case where it is determined that the value written into the name area in S401 is the normal value, the processing proceeds to S404. In a case where it is determined that the value written into the name area in S401 is not the normal value, the processing of FIG. 4 ends, and the flow proceeds to the processing illustrated in FIG. 5. It should be noted that the communication apparatus 151 may save information indicating that the pairing is not executed in the RAM 153 in a case where it is determined that the value written into the name area in S401 is not the normal value.

In S404, the communication apparatus 151 saves the value written into the name area in the communication apparatus 151 (that is, the name of the information processing apparatus 101) and information indicating that the pairing is executed in a specific storage area in the communication apparatus 151. The specific storage area in the communication apparatus 151 is set as the RAM 153 herein, but other storage areas may also be used. It should be noted that the information indicating that the pairing is executed and the information indicating that the pairing is not executed are flag information and the like indicating whether or not the pairing is executed. A saving destination of these pieces of information may be a non-volatile memory or an external storage device. The information saved at this time may also be deleted after an elapse of a certain period of time. At this time, all of the values written into the name area may be saved, or a part of the values may be saved. Hereinafter, the values written into the name area which are saved in the storage area in S404 will be referred to as name data. In addition, a mode may be adopted in which the information indicating that the pairing is executed or the information indicating that the pairing is not executed is transmitted to the short-range communication unit 157, and a determination in S503 which will be described below can be executed by the short-range communication unit 157.

Figure 5:
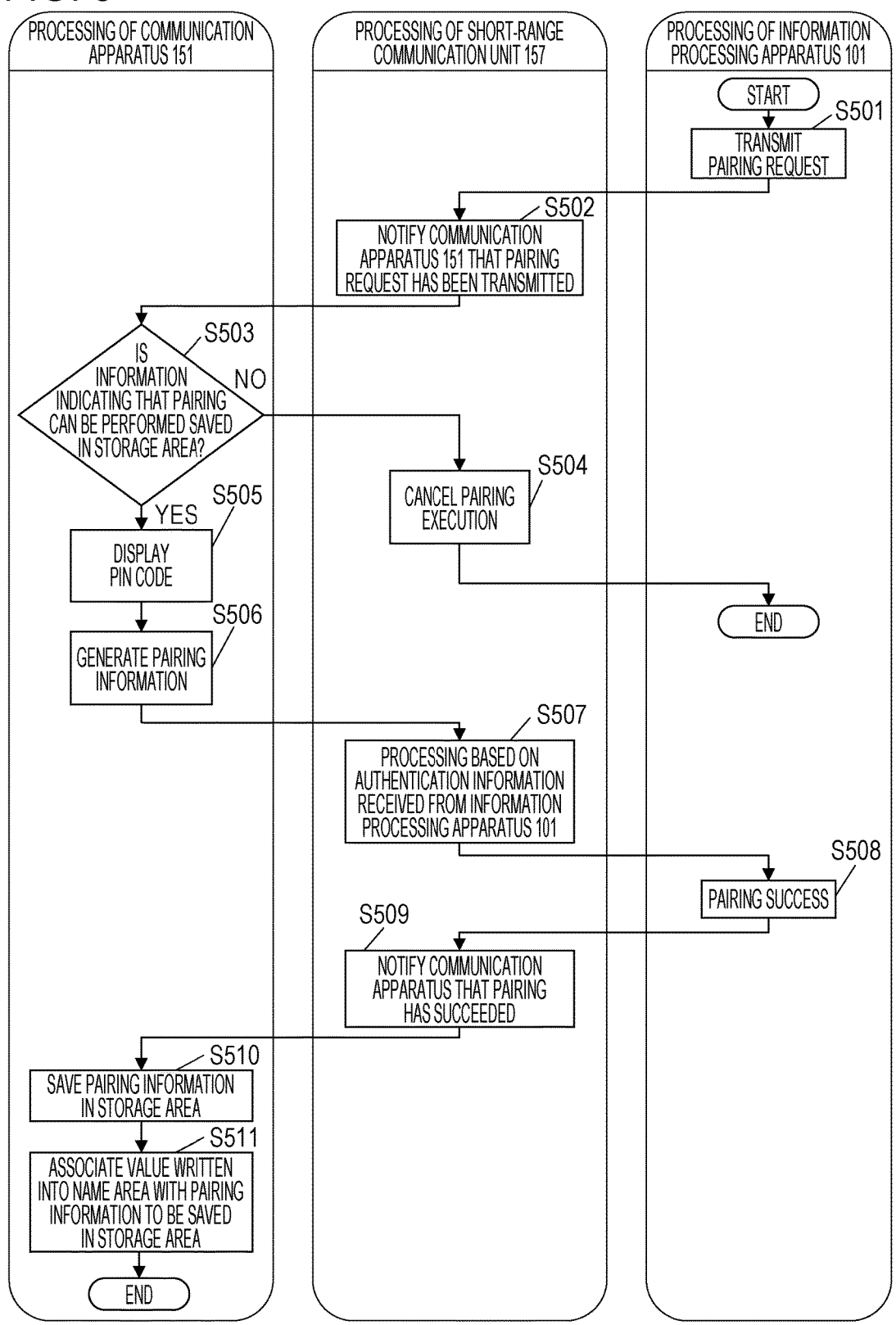
FIG. 5 is a flow chart illustrating the processes executed by the respective apparatuses in a case where an execution request of the pairing processing is performed.

It should be noted that according to the present exemplary embodiment, the write into the name area is executed before the pairing processing illustrated in FIG. 5, but the configuration is not limited to this mode. For example, a mode may also be adopted in which the write into the name area may be executed during the pairing processing or after the pairing processing. In this case, the write of the value in conformity to the specific rule may be performed with respect to an area other than the name area.

FIG. 5 illustrates the processing for the communication apparatus 151 and the information processing apparatus 101 to execute the processing via the short-range communication unit 157 and the short-range communication unit 110. FIG. 5 is a flow chart illustrating the processes executed by the respective apparatuses in a case where the execution request of the pairing processing is performed. It should be noted that, in the flow chart of FIG. 5, the processing executed by each of the apparatuses is realized when the CPU of each of the apparatuses develops the various programs stored in the storage area of each of the apparatuses into the RAM of each of the apparatuses and executes the developed programs in actuality. It should be noted that, for example, the processing executed by the short-range communication unit 157 may be controlled by the CPU included in the communication apparatus 151, and the processing executed by the short-range communication unit 110 may be controlled by the CPU included in the information processing apparatus 101. The processing from S501 in the flow chart of FIG. 5 is started, for example, after S404 is executed. In addition, the processing from S501 in the flow chart of FIG. 5 is started in a state in which the short-range communication unit 157 and the short-range communication unit 110 establish the Bluetooth® Low Energy connection and can execute the GATT communication.

In S501, the information processing apparatus 101 transmits a pairing request to the short-range communication unit 157 via the short-range communication unit 110. It should be noted that the communication between the apparatuses is performed by a security manager protocol until the pairing is ended. Before the pairing request is transmitted, the information processing apparatus 101 may access an area where write and read are not performed unless it is already paired among the GATT data constituted by the short-range communication unit 157. In a case where the access to this area from the information processing apparatus 101 exists in the unpaired state, the short-range communication unit 157 transmits an error to the information processing apparatus 101. Then, in a case where the information processing apparatus 101 receives the error, the information processing apparatus 101 transmits the pairing request to the short-range communication unit 157.

In S502, the short-range communication unit 157 notifies the communication apparatus 151 (or the CPU 154 of the communication apparatus 151) that the pairing request has been transmitted. A configuration for notifying that the pairing request has been transmitted may be a configuration in which the short-range communication unit 157 causes the CPU 154 to generate an interruption or a configuration in which the CPU 154 polls the state of the short-range communication unit 157.

In S503, the communication apparatus 151 determines whether or not the information indicating that the pairing is executed is saved in the specific storage area. In a case where YES is determined, the processing proceeds to S505, and in a case where NO is determined, the processing proceeds to S504.

When the short-range communication unit 157 accepts a notification based on the determination result in S503 (determined as NO) from the communication apparatus 151, it is specified in S504 that the pairing with the information processing apparatus 101 is not executed. Specifically, the short-range communication unit 157 transmits an error to the information processing apparatus 101, for example. It should be noted that the communication apparatus 151 may display a screen for notifying that an error occurs in the pairing on the display unit 160 at this time. In a case where the information indicating that pairing is not executed is stored in the specific storage area, the communication apparatus 151 may also delete the information.

Figure 10A:
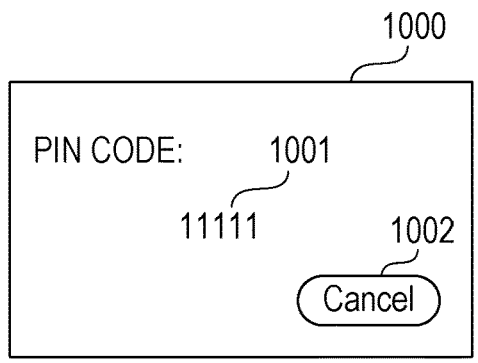
FIGS. 10A and 10B illustrate an example of a screen displayed at the time of the pairing processing.

In S505, the communication apparatus 151 presents the PIN code to the user by displaying a screen including a PIN code used for the pairing on the display unit 160. Specifically, the communication apparatus 151 displays a PIN code display screen 1000 as illustrated in FIG. 10A on the display unit 160. A PIN code 1001 and a cancel button 1002 for cancelling the pairing processing are displayed on the PIN code display screen 1000. It should be noted that the communication apparatus 151 may present the PIN code to the user by printing the PIN code by using the print engine 155. According to the present exemplary embodiment, the PIN code is saved in the ROM 152. It should be noted however that the saving destination of the PIN code is not limited to this. For example, a configuration may also be adopted in which the PIN code is saved in the short-range communication unit 157, and the short-range communication unit 157 notifies the communication apparatus 151 of contents of the PIN code at the time of the display of the PIN code.

In S506, the communication apparatus 151 generates pairing information by using pairing with the information processing apparatus 101. The pairing information includes an encryption key (link key) used for an encryption of the GATT communication after the pairing and generation information (EDIV or RAND) used for an authentication when the information processing apparatus 101 and the communication apparatus 151 establish the Bluetooth® Low Energy connection for the next time. It should be noted that the contents of the pairing information generated at this time are different from the contents of the pairing information generated in the pairing that has been previously executed. In addition, according to the present exemplary embodiment, the communication apparatus 151 generates the pairing information, but the information processing apparatus 101 may generate the pairing information.

Figure 10B:
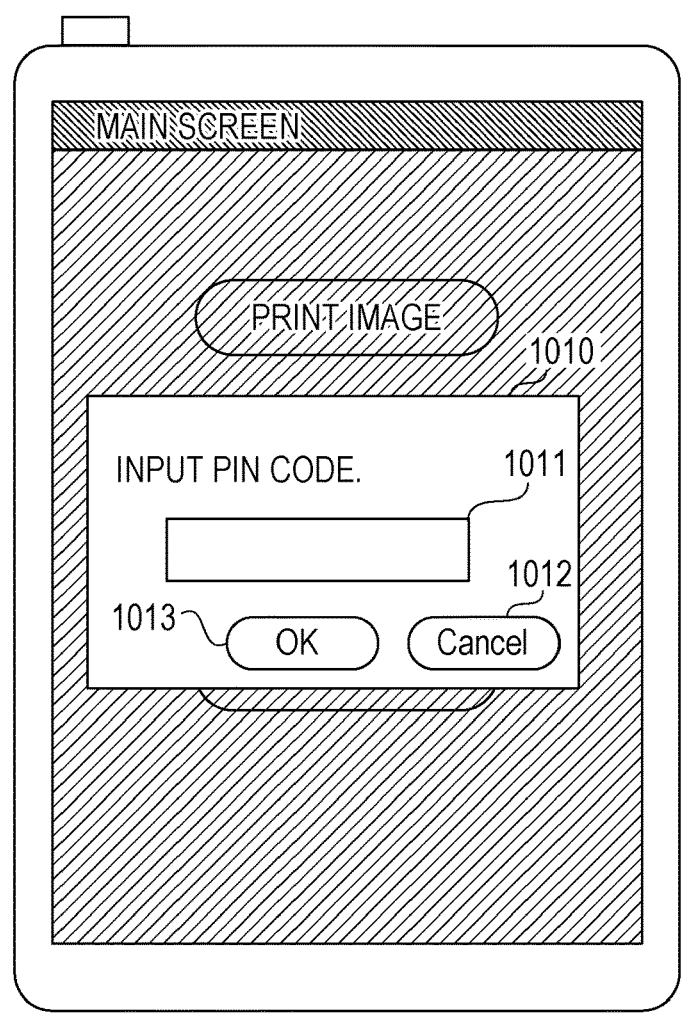

It should be noted that, when the pairing request is transmitted, the information processing apparatus 101 displays a PIN code input screen 1010 on the display unit 108 as illustrated in FIG. 10B. A PIN code input area 1011, an OK button 1013, and a cancel button 1012 are displayed on the PIN code input screen 1010. The PIN code input area 1011 is an area for accepting the input of the PIN code 1001 by the user. The OK button 1013 is a button for transmitting the input PIN code 1001 to the communication apparatus 151. The cancel button 1012 is a button for cancelling the pairing processing.

The user inputs the PIN code 1001 presented to the communication apparatus 151 by the processing in S505 to the PIN code input area 1011. When the OK button 1013 is pressed in a state in which the PIN code 1001 is input to the PIN code input area 1011, the information processing apparatus 101 transmits authentication information encrypted on the basis of the input PIN code to the communication apparatus 151.

In S507, the short-range communication unit 157 obtains the authentication information from the information processing apparatus 101. Then, the short-range communication unit 157 determines whether or not pairing is permitted on the basis of the obtained authentication information. Specifically, the short-range communication unit 157 analyzes the authentication information and determines whether or not the authentication information is based on the PIN code presented by the communication apparatus 151. Then, since the short-range communication unit 157 permits the pairing when it is determined as YES, the notification indicating the success of the pairing and also the pairing information generated in S506 are transmitted to the information processing apparatus 101. In this manner, the pairing is completed, and thereafter, the execution of the Bluetooth® Low Energy communication between the apparatuses is permitted. On the other hand, when it is determined as NO, the pairing is not permitted. An error indicating a failure of the pairing is transmitted to the information processing apparatus 101.

In S508, the information processing apparatus 101 receives the information from the short-range communication unit 157 via the short-range communication unit 110. In a case where the information processing apparatus 101 receives the notification indicating the success of the pairing or the pairing information, the information processing apparatus 101 saves the pairing information in a predetermined storage area. Furthermore, the information processing apparatus 101 hides the PIN code input screen 1010 and displays the screen at a time before the PIN code input screen 1010 is displayed again. On the other hand, in a case where the error is received, the information processing apparatus 101 displays a screen indicating a failure of the pairing. It should be noted that, at this time, the information processing apparatus 101 may urge the user to input the correct PIN code or may accept an input for determining whether the pairing processing is continued or stopped from the user.

In the communication after the success of the pairing, the information processing apparatus 101 first transmits the generation information such as EDIV or RAND saved in the storage area at the time of the pairing processing to the communication apparatus 151. The communication apparatus 151 compares the received generation information with the generation information saved in the storage area at the time of the pairing processing and recognizes that the information processing apparatus 101 is the already paired apparatus. As a result, the communication apparatus 151 thereafter permits the information processing apparatus 101 to access (read and write) to the area used for the pairing in GATT data by the information processing apparatus 101. Then, the information processing apparatus 101 transmits the GATT communication request (the write request or the read request of the GATT data) encrypted by using the link key saved in the storage area at the time of the pairing processing to the communication apparatus 151. As a result, once the pairing processing with the communication apparatus 151 is completed, the information processing apparatus 101 can hereinafter execute the GATT communication with the communication apparatus 151 without the input of the PIN code by the user.

It should be noted that the mode has been described above in which the user is urged to input the PIN code 1001 displayed on the PIN code display screen 1000 into the PIN code input area 1011 in the pairing processing, but the configuration is not limited to this mode. For example, the pairing processing may be executed by a JustWorks method. The JustWorks method refers to a method for the information processing apparatus 101 to automatically transmit the information based on the previously determined PIN code to the communication apparatus 151 in a state in which a predetermined button of the communication apparatus 151 is pressed. The JustWorks method refers to a method for the information processing apparatus 101 to automatically transmit the information based on the previously determined PIN code to the communication apparatus 151 within a predetermined of time since the predetermined button of the communication apparatus 151 is pressed. In this mode, since the previously determined PIN code is transmitted, the user does not need to perform the input of the PIN code with respect to the screen displayed by the information processing apparatus 101. In addition, the communication apparatus 151 does not need to present the PIN code to the user. A configuration may be adopted in which the previously determined PIN code is stored in the information processing apparatus 101 along with the installment of the printing application or is previously stored in an operating system (OS) of the information processing apparatus 101.

It should be noted that a case where the pairing is permitted will be described below.

In S509, the short-range communication unit 157 notifies the communication apparatus 151 (or the CPU 154 of the communication apparatus 151) of the success of the pairing. The configuration for notifying of the success of the pairing may be a configuration in which the short-range communication unit 157 causes the CPU 154 to generate an interruption or a configuration in which the CPU 154 polls the state of the short-range communication unit 157.

In S510, the communication apparatus 151 saves the pairing information generated in S506 in the storage area of the communication apparatus 151. In this manner, the pairing information is saved in both the storage area in the information processing apparatus 101 (such as the ROM 104) and the storage area in the communication apparatus 151 (such as the ROM 152). It should be noted that the saving destination of the pairing information may be the RAM 153 in the communication apparatus 151, a non-volatile memory, or an external storage device. The information saved at this time may also include the information received from the short-range communication unit 157 in S509. In addition, the communication apparatus 151 stops the display of the PIN code display screen 1000 at this time since the pairing has succeeded.

In S511, the communication apparatus 151 associates the name data saved in the RAM 153 in S404 with the pairing information saved in the ROM 152 in S510 to be saved in the ROM 152. It should be noted that the saving destination of the name data may be a destination other than the ROM 152. When the name data is already saved in the ROM 152 in S404, the processing in S511 may also be processing for only associating the name data with the pairing information. The method for the association may be a method of generating information in which contents of the association are described or a method of managing addresses of the saving destinations of the respective pieces of information.

In this manner, the information processing apparatus 101 and the communication apparatus 151 can execute the pairing.

It should be noted that the communication apparatus 151 has a function of displaying a list of the already paired apparatuses (display screen on which the already paired apparatuses are displayed) on the display unit 160. When the user checks the list, it is possible to check which apparatus is paired with the communication apparatus 151. Then, according to the present exemplary embodiment, the communication apparatus 151 displays the saved name data (that is, the name of the already paired apparatus) associated with the pairing information in the list of the already paired apparatuses.

It should be noted that the name of the information processing apparatus 101 may be a name that can be arbitrarily changed by the user on the information processing apparatus 101 or a model name of the information processing apparatus 101. Incidentally, for example, the Bluetooth® Low Energy specifications regulate that a MAC address or the like of the short-range communication unit 110 is passed from the information processing apparatus 101 to the communication apparatus 151 at the time of the pairing. However, in general, it is difficult for the user to identify the information processing apparatus 101 by using the information such as the MAC address including an irregular character string. For this reason, according to the present exemplary embodiment, information other than the identification information where it is difficult for the user to identify the information processing apparatus 101 like information set by the Bluetooth® Low Energy specifications to be communicated between the apparatuses at the time of the pairing is used as the name of the information processing apparatus 101. As a result, it becomes easier for the user to understand which apparatus is already paired as compared with a mode in which the information such as the MAC address is displayed on the list of the already paired apparatuses, for example. That is, according to the present exemplary embodiment, a reason why the information processing apparatus 101 is caused to perform the write into the name area before the pairing is not only the determination in S403 is to be performed but also the information is obtained which is used for creating the list that can be easily understood by the user corresponding to the information that is not set by the Bluetooth® Low Energy specifications to be communicated between the apparatuses at the time of the pairing.

Figure 6:
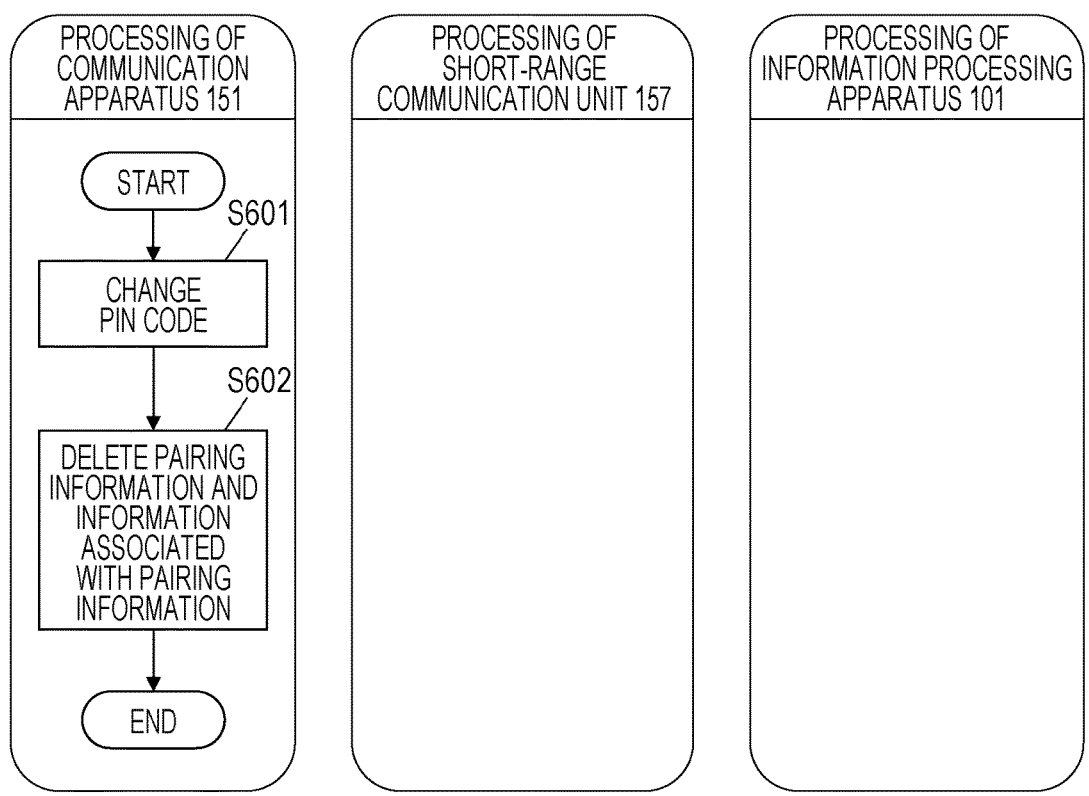
FIG. 6 is a flow chart illustrating processing when the communication apparatus changes a PIN code.

FIG. 6 is a flow chart illustrating processing when the communication apparatus 151 changes the PIN code. It should be noted that the processing executed by the communication apparatus 151 is realized when the CPU 154 develops the various programs stored in the ROM 152 or the like into the RAM 153 and executes the developed programs in actuality in the flow chart of FIG. 6. The processing from S601 in the flow chart of FIG. 6 is started in a state in which the pairing has been already performed with any one of the apparatuses. The processing from S601 in the flow chart of FIG. 6 is also started in a case where the communication apparatus 151 accepts the execution instruction of the reset processing. The execution instruction of the reset processing may be accepted by the communication apparatus 151 via the input interface 158 from the user or may also be a trigger signal issued in a case where a predetermined period of time elapses since the reset processing has been executed for the previous time. The reset processing is processing for returning the already authenticated apparatus as a result of the execution of the pairing into an unauthenticated state. Specifically, the reset processing is processing for changing the PIN code used in the already executed pairing or processing for deleting the information related to the already executed pairing. The apparatus (already authenticated apparatus) that can perform read and write with respect to the pairing necessary area does not perform read and write with respect to the pairing necessary area by the reset processing until the pairing processing is executed again.

In S601, the communication apparatus 151 changes the PIN code saved in the memory. In a case where the communication apparatus 151 accepts the operation for changing the PIN code from the user, the communication apparatus 151 accepts the input of the desired PIN code from the user and sets the accepted PIN code as the PIN code after the change. It should be noted that the communication apparatus 151 may automatically change the PIN code saved in the memory into contents different from those of the pervious time without accepting the input from the user. The saving destination of the PIN code after the change is similar to the saving destination of the PIN code before the change. In a case where the PIN code is changed, hereinafter, until the PIN code is changed again, the PIN code after the change is presented to the user in S505.

In S602, the communication apparatus 151 deletes the information related to the pairing that has been executed before the execution instruction of the reset processing is accepted. The information related to the pairing before the execution instruction of the reset processing is accepted is the pairing information generated in the pairing that has been executed before the execution instruction of the reset processing is accepted, for example. The information is also the saved name data (that is, the name of the apparatus authenticated by the pairing that has been executed before the execution instruction of the reset processing is accepted) associated with the pairing information generated in the pairing by the PIN code before the change, for example. It should be noted that, for example, in a case where the communication apparatus 151 executes the pairing plural times before the execution instruction of the reset processing is accepted, information related to all the pairing operations performed plural times may be deleted, or information related to a part of the pairing operations may be deleted. According to the present exemplary embodiment, the information related to all the pairing operations performed plural times is deleted.

As a result, the communication apparatus 151 resets (cancels) the pairing that has been executed before the execution instruction of the reset processing is accepted. At the time of the change of the PIN code, in a case where an apparatus that establishes the Bluetooth® Low Energy connection exists, the Bluetooth® Low Energy connection with the apparatus is cancelled.

As described above, the communication apparatus 151 includes the function of displaying the list of the already paired apparatuses on the display unit 160. When the reset processing is executed, the pairing that has been executed before the execution instruction of the reset processing is accepted is reset, and also the information related to the pairing that has been executed before the execution instruction of the reset processing is accepted is deleted. For this reason, the information related to the apparatus corresponding to the target of the pairing that has been executed before the execution instruction of the reset processing is accepted is deleted from the list. It should be noted that a mode may also be adopted in which the pairing with a certain apparatus can be cancelled even when the reset processing is not executed. For example, the user desires to cancel the pairing with the certain apparatus, one or a plurality of apparatus names of the pairing cancellation targets are selected from the list, and the pairing cancelling operation is executed. As a result, the communication apparatus 151 deletes the name data of the selected apparatus or the pairing information shared with the selected apparatus and deletes the information related to the selected apparatus from the list.

It should be noted that the mode in which the PIN code is changed in the reset processing has been described above, but the configuration is not limited to this mode. A mode may also be adopted in which the PIN code is not changed in the reset processing, and only the deletion of the information related to the pairing processing is performed.

As described above, according to the present exemplary embodiment, the communication apparatus 151 associates other data with the pairing information to be saved at the time of the pairing with the information processing apparatus 101. Then, in a case where the reset processing is executed in the communication apparatus 151, both the information associated with the pairing information the information that is not set to be obtained by the Bluetooth® Low Energy specifications at the time of the pairing processing and the pairing information are deleted. As a result, information confidentiality is improved, and a pressure on the memory remaining amount while the information remains in the memory can be suppressed. Furthermore, after the reset processing, it is possible to delete the unnecessary information from the list indicating the already paired apparatuses.

Second Exemplary Embodiment

The information processing apparatus and the communication apparatus included in the communication system according to the present exemplary embodiment will be described. It should be noted that, according to the present exemplary embodiment, a communication system similar to that of the first exemplary embodiment is used, and a description of a configuration similar to that of the first exemplary embodiment will be omitted.

The communication apparatus 151 can communicate with the other apparatus by the communication unit 156 on the basis of not only Bluetooth® Low Energy but also the communication method other than Bluetooth® Low Energy. Then, the information processing apparatus 101 can execute the communication setting of the communication method other than Bluetooth® Low Energy of the communication apparatus 151 by Bluetooth® Low Energy. The communication method other than Bluetooth® Low Energy is Wi-Fi® according to the present exemplary embodiment, but the other communication method may also be adopted.

Figure 7:
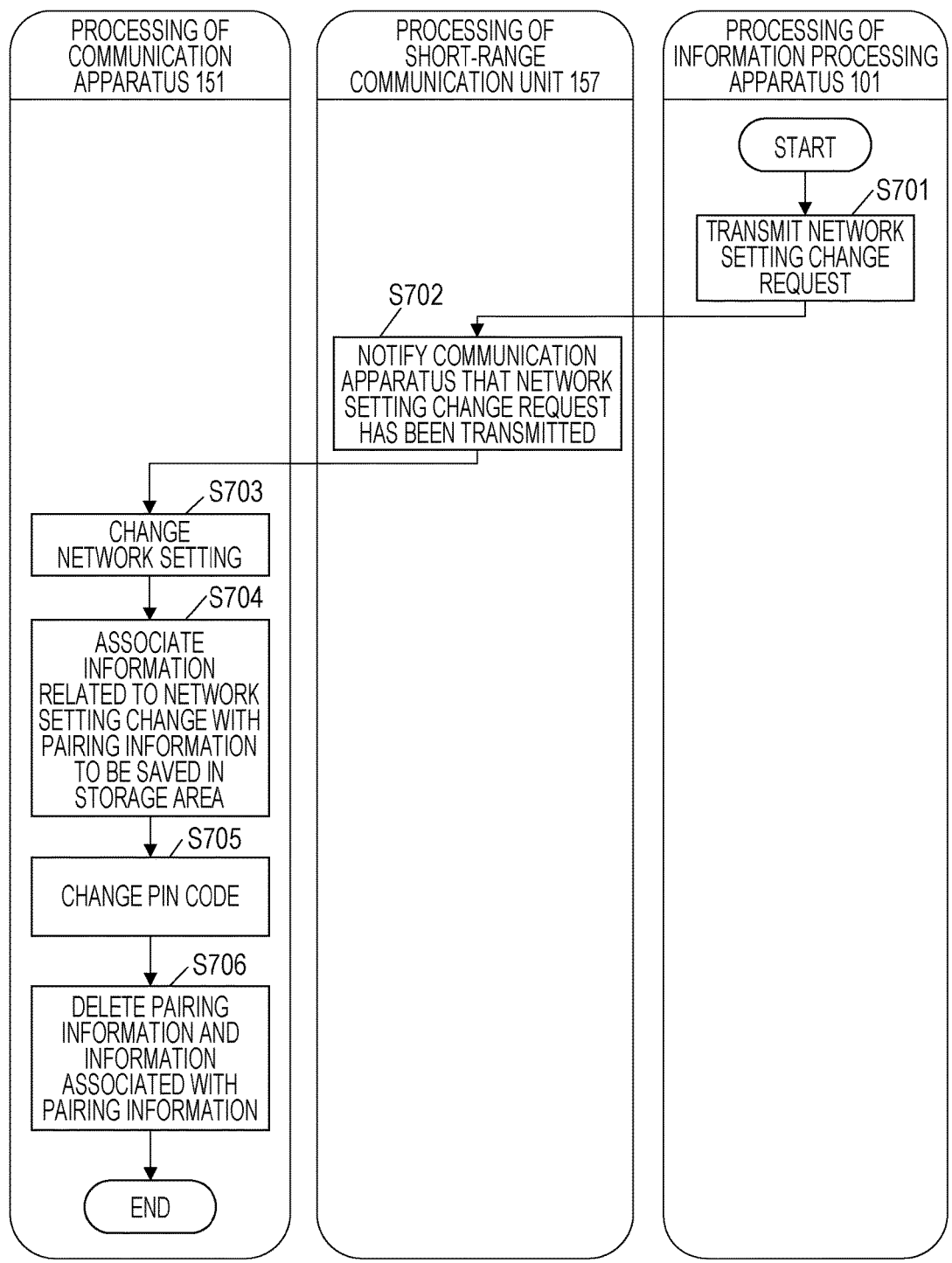
FIG. 7 is a flow chart illustrating the processes executed by the respective apparatuses when Wi-Fi® communication setting processing is executed.

FIG. 7 is a flow chart illustrating processing when the communication apparatus 151 and the information processing apparatus 101 executes Wi-Fi® communication setting processing via the short-range communication unit 110 and the short-range communication unit 157 according to the present exemplary embodiment. It should be noted that, in the flow chart of FIG. 7, the processing executed by each of the apparatuses is realized when the CPU of each of the apparatuses develops the various programs stored in the storage area of each of the apparatuses into the RAM of each of the apparatuses and executes the developed programs in actuality. It should be noted that, for example, the processing executed by the short-range communication unit 157 may be controlled by the CPU included in the communication apparatus 151, and the processing executed by the short-range communication unit 110 may be controlled by the CPU included in the information processing apparatus 101. The present processing is started in a state in which the pairing processing with the communication apparatus 151 is completed as illustrated in the first exemplary embodiment.

In S701, the information processing apparatus 101 transmits a request for changing the Wi-Fi® communication setting of the communication apparatus 151 (setting change request). The method for the Wi-Fi® connection between the communication apparatus 151 and the other apparatus may be the direct connection method or the infrastructure connection method. According to the present exemplary embodiment, the information processing apparatus 101 performs the setting for causing the communication apparatus 151 to execute the connection based on the infrastructure connection method. The external access point used for the connection based on the infrastructure connection method is the access point 131 to which the information processing apparatus 101 is being connected. For this reason, after the setting change request is transmitted, the information processing apparatus 101 writes the connection information for establishing the connection to the access point 131 (such as the SSID or the password of the access point 131) into the specific area of the GATT data.

In S702, the short-range communication unit 157 notifies the communication apparatus 151 (or the CPU 154 of the communication apparatus 151) that the setting change request has been transmitted. The configuration for notifying that the setting change request has been transmitted may be a configuration in which the short-range communication unit 157 causes the CPU 154 to generate an interruption or a configuration in which the CPU 154 polls the state of the short-range communication unit 157.

In S703, the communication apparatus 151 changes the Wi-Fi® communication setting on the basis of the information written from the information processing apparatus 101. Specifically, according to the present exemplary embodiment, the communication apparatus 151 establishes the network connection to the access point 131 based on Wi-Fi® by using the information written from the information processing apparatus 101.

In S704, the communication apparatus 151 associates the information related to the network connection based on Wi-Fi® the access point 131 with the pairing information shared with the information processing apparatus 101 to be saved. The information related to the network connection to the access point 131 based on Wi-Fi® is, for example, information indicating that the network connection to the access point 131 has been executed by the instruction based on Bluetooth® Low Energy or the connection information for establishing the connection to the access point 131.

As a result, the communication apparatus 151 can change the Wi-Fi® communication setting via the Bluetooth® Low Energy communication with the information processing apparatus 101.

In S705, the communication apparatus 151 changes the PIN code. It should be noted that the processing from S705 is also started in a case where the communication apparatus 151 accepts the execution instruction of the reset processing. The present processing is similar to S601, and the detail thereof will be omitted.

In S706, the communication apparatus 151 deletes the information related to the pairing executed by the PIN code before the change. Although the present processing is similar to S602, since the information related to the network connection to the access point 131 based on Wi-Fi® is associated with the pairing information at this time, this information is also deleted. As a result, the communication apparatus 151 cuts off the network connection to the access point 131 based on Wi-Fi®.

As described above, according to the second exemplary embodiment, when the communication apparatus 151 is paired with the information processing apparatus 101, the communication apparatus 151 associates the pairing information with the network setting information executed after the pairing to be saved. Then, in a case where the PIN code of the communication apparatus 151 is changed, both the pairing information and the network setting information saved in the communication apparatus 151 are deleted. As a result, not only the pairing information but also the associated information executed after the pairing can be deleted by only the operation for changing the PIN code, and it is possible to provide the communication system realizing both the convenience and the information confidentiality.

Third Exemplary Embodiment

The information processing apparatus and the communication apparatus included in the communication system according to the present exemplary embodiment will be described. It should be noted that, according to the present exemplary embodiment, a communication system similar to that of the first exemplary embodiment is used, and a description of a configuration similar to that of the first exemplary embodiment will be omitted.

The communication apparatus 151 can communicate with the other apparatus by the communication unit 156 on the basis of the communication method other than Bluetooth® Low Energy. According to the present exemplary embodiment, the communication apparatus 151 executes handover via Bluetooth® Low Energy. The handover refers to a technology in which each of the apparatuses that performs the communication first exchanges the connection information for performing the communication based on the high-speed communication method by the short-range communication method and thereafter switches the method to the high-speed communication method to perform the data transmission and reception. According to the present exemplary embodiment, Bluetooth® Low Energy is used as the short-range communication method, and Wi-Fi® is used as the high-speed communication method. The communication speed of the GATT communication is lower than that of the Wi-Fi® communication. For this reason, the authentication between the apparatuses, the exchange of the connection information for the Wi-Fi® communication (high-speed communication information), or the like is performed in the GATT communication, and the transfer of the data (herein, the job) having the large capacity is performed in the Wi-Fi® communication having the high communication speed, so that the efficient data transfer can be realized.

FIG. 14 is a sequence chart in a case where the information processing apparatus 101 and the communication apparatus 151 perform the handover on the basis of the Bluetooth® Low Energy communication method. Herein, a case where the transmission and the reception of the job are performed by the handover will be described as an example.

It should be noted that the processing of the communication apparatus 151 which is represented by this processing sequence is realized when the CPU 154 loads a control program stored in an HDD (not illustrated) included in the ROM 152 or the communication apparatus 151 into the RAM 153 and executes the control program. In addition, the processing of the information processing apparatus 101 which is represented by this processing sequence is realized when the CPU 103 loads a control program stored in an HDD (not illustrated) included in the ROM 104 or the information processing apparatus 101 into the RAM 105 and executes the control program. Moreover, the processing represented by this processing sequence is started in a state in which the pairing based on Bluetooth® Low Energy is completed between the information processing apparatus 101 and the communication apparatus 151.

In the following explanation, the communication apparatus 151 is set as an advertiser configured to transmit the advertising information in a predetermined cycle. The information processing apparatus 101 is set as a scanner configured to wait for the advertising information transmitted from the advertiser existing in the surrounding. First, the short-range communication unit 157 performs the transmission of the advertising information (S1401 to S1403). When the short-range communication unit 110 receives the advertising information transmitted from the short-range communication unit 157, the information processing apparatus 101 can recognize the presence of the communication apparatus 151.

When the information processing apparatus 101 recognizes the communication apparatus 151 and determines that the connection is to be established with the communication apparatus 151, connection request information is transmitted to the communication apparatus 151. Specifically, the short-range communication unit 110 transmits CONNECT_REQ corresponding to a request for a transition to a connection event for establishing a network connection based on Bluetooth® Low Energy (S1404). When the short-range communication unit 157 receives CONNECT_REQ, the information processing apparatus 101 and the communication apparatus 151 prepares for the transition to the connection event. Specifically, the short-range communication unit 110 and the short-range communication unit 157 respectively notify the CPU 103 and the CPU 154 that the connection processing for the GATT communication is completed.

Thereafter, the information processing apparatus 101 and the communication apparatus 151 respectively make transition from the scanner and the advertiser to the master and the slave, and the information processing apparatus 101 acting as the master and the communication apparatus 151 acting as the slave establishes the connection for the GATT communication (Bluetooth® Low Energy connection). It should be noted that the master can form a "1:multi" star-type topology with the slaves in the Bluetooth® Low Energy specifications. When the Bluetooth® Low Energy connection is established, the information processing apparatus 101 and the communication apparatus 151 can thereafter perform the data communication based on the GATT communication method.

Thereafter, in S1405, the short-range communication unit 110 requests the short-range communication unit 157 for the information of the communication protocol that can be used by the communication apparatus 151.

This request includes the information of the communication protocol that can be used by the information processing apparatus 101. When the short-range communication unit 157 receives this request, it is possible to recognize that the information processing apparatus 101 can use a communication method such as Wi-Fi®. In S1406, the short-range communication unit 157 responds the information of the communication protocol that can be used by itself with respect to the request received in S1405. As a result, the mutual apparatuses can understand the communication protocol that can be mutually used other than Bluetooth® Low Energy.

Herein, when the communication protocol that can be mutually used other than Bluetooth® Low Energy is understood, it is assumed that the information processing apparatus 101 determines that the communication between the apparatuses is switched to the Wi-Fi® communication. It should be noted that the communication apparatus 151 may determine whether or not the switching of the communication method is performed at this time. In a case where it is determined that the switching of the communication method is performed, in S1407 and S1408, each of the apparatuses exchanges the communication information used for performing the Wi-Fi® communication such as information of an address for specifying the communication partner or the SSID. Specifically, the short-range communication unit 157 transmits the Wi-Fi® connection information (password or SSID) for establishing a connection to the access point inside the communication apparatus 151. Thereafter, in S1409, the short-range communication unit 110 transmits a request (communication switching request) for switching the communication method between the apparatuses from the GATT communication to the Wi-Fi® communication. When the short-range communication unit 157 receives the switching request, the short-range communication unit 157 performs a response in S1410.

When the switching request and the response are correctly performed, in S1411, the information processing apparatus 101 switches the communication unit used for the communication with the communication apparatus 151 from the short-range communication unit 110 to the communication unit 109. Furthermore, in S1412, the communication apparatus 151 switches the communication unit used for the communication with the information processing apparatus 101 from the short-range communication unit 157 to the communication unit 156. Specifically, the communication apparatus 151 activates the internal access point, and the information processing apparatus 101 establishes the connection to the access point by using the Wi-Fi® connection information received by Bluetooth® Low Energy. After the switching is performed, in S1413, the short-range communication unit 110 transmits a release request. The short-range communication unit 157 that has received the release request transmits a release response in S1414 and ends the Bluetooth® Low Energy connection between the apparatuses. When the Bluetooth® Low Energy connection between the apparatuses is ended, the information processing apparatus 101 and the communication apparatus 151 respectively return to the scanner and the advertiser, and the short-range communication unit 157 resumes the transmission of the advertising information. It should be noted that the Bluetooth® Low Energy connection between the apparatuses may be continued without being ended at this time.

Thereafter, each of the apparatuses performs the Wi-Fi® communication by using the information used for the Wi-Fi® communication which is exchanged in S1407 and S1408. First, in S1415, the communication unit 109 checks the communication unit 156 if the communication apparatus 151 can obtain the job. Herein, for example, information of the free space for temporarily saving the image to be transferred to the communication apparatus 151 or the like is checked. After the check request is received, the communication unit 156 transmits a response with respect to the check in S1416.

In a case where the correct response is obtained and it is determined that the communication apparatus 151 can obtain the job, the communication unit 156 requests the job in S1417. Thereafter, the communication unit 109 that has received the job request transmits the job including the image data existing in the information processing apparatus 101 or the like to the communication unit 156 in S1418. It should be noted that the selection of the job transmitted at this time may be performed, for example, at a timing before the Bluetooth® Low Energy connection is established or after the Bluetooth® Low Energy connection is established, a timing after the Wi-Fi® connection is established, or the like and may also be performed before the Bluetooth® Low Energy connection is established. The job to be transmitted is not limited to the printing job and may be, for example, a scanning job for instructing the communication apparatus 151 to perform the scanning, a job for the information processing apparatus 101 to obtain the information of the state of the communication apparatus 151, or the like. In addition, for example, the job may be a command for executing various operations with respect to the communication apparatus 151 such as the setting of the communication apparatus 151, or the like.

It should be noted that, in a case where the job transmission is completed, the information processing apparatus 101 cuts off the Wi-Fi® connection to the communication apparatus 151 and returns to the network state immediately before the handover. Specifically, for example, in a case where the connection is established to a mobile communication network such as 3G or LTE or the access point such as a router before the handover is executed, the information processing apparatus 101 establishes the connection to the mobile communication network or the access point again. For this reason, the information processing apparatus 101 and the communication apparatus 151 save the information of the network state immediately before the handover, the communication information used for returning to the network state immediately before the handover, and the like before the handover is executed. The information processing apparatus 101 also saves the communication information obtained at the time of the handover. When the job is transmitted in the next time, the information processing apparatus 101 may directly perform the Wi-Fi® connection by using the communication information without the intermediation of Bluetooth® Low Energy. After the job transmission based on the handover is performed, the Wi-Fi® connection between the apparatuses may continue without being cut off.

In this manner, when the handover technology is used, the connection information for performing the communication based on the high-speed communication method can be exchanged by the communication method (short-range communication method) having the high usability, and thereafter, the exchange of the data having the large capacity can be performed by the high-speed communication method at a high speed.

It should be noted that the mode in which the job is transmitted after the handover has been described above, but a mode may also be adopted in which the handover is executed for simply establishing the Wi-Fi® connection without the transmission of the job.

As described in the first exemplary embodiment, in a case where the reset processing is executed, the information related to the pairing executed before the execution of the reset processing is deleted according to the exemplary embodiment. This is the configuration for stopping the communication with the apparatus set as the target of the pairing executed before the execution of the reset processing until the pairing is executed again. However, in a case where the handover is already performed as described above, the method for the communication between the apparatuses may be switched from Bluetooth® Low Energy to Wi-Fi® in some cases. When the communication apparatus 151 deletes the information related to the pairing executed before the execution of the reset processing, it is possible to stop the communication based on Bluetooth® Low Energy with the apparatus set as the target of the pairing executed before the execution of the reset processing. However, the communication apparatus 151 does not stop the communication with the apparatus based on Wi-Fi®. For this reason, according to the present exemplary embodiment, in a case where the reset processing is executed, a description will be provided of a mode in which the communication based on the communication method other than Bluetooth® Low Energy with the apparatus set as the target of the pairing executed before the execution of the reset processing is also stopped.

FIG. 9 is a flow chart illustrating the processing when the communication apparatus 151 changes the PIN code. It should be noted that the processing executed by the communication apparatus 151 in the flow chart of FIG. 9 is realized when the CPU 154 develops the various programs stored in the ROM 152 or the like into the RAM 153 and executes the developed programs in actuality. The processing from S901 in the flow chart of FIG. 9 is started in a state in which the pairing has been already performed with any one of the apparatuses.

The processing in S901 and S902 is similar to the processing in S601 and S602, and the detail thereof will be omitted.

In S903, the communication apparatus 151 determines whether or not the handover with the information processing apparatus 101 that has shared the pairing information deleted in S902 is executed. In a case where YES is determined, the processing proceeds to S904, and in a case where NO is determined, the processing is ended without the change of the communication information used for performing the Wi-Fi® communication.

In S904, the communication apparatus 151 changes the contents of the communication information used for performing the Wi-Fi® communication. Specifically, the SSID or the password of the access point in the communication apparatus 151 is changed. As a result, the Wi-Fi® communication with the information processing apparatus 101 that has shared the pairing information deleted in S902 is stopped. Even when the information processing apparatus 101 that has executed the handover beforehand saves the communication information obtained at the time of the handover, the communication information is changed in the processing in S904. Therefore, the saved communication information is not used for the communication with the communication apparatus 151.

In this manner, according to the present exemplary embodiment, in a case where the reset processing is executed, it is also possible to stop the communication based on the communication method other than Bluetooth® Low Energy with the apparatus set as the target of the pairing executed before the execution of the reset processing.

Other Exemplary Embodiments

According to the above-described exemplary embodiment, a state of "already paired" refers to a state in which an encrypted connection can be established without performing the setting procedure for the pairing again also at the time of the connection after the setting processing of the pairing (procedure for generating a temporary common security encryption key). That is, "pairing" according to the present exemplary embodiment indicates processing including "bonding" in which generation and exchange of a permanent security encryption key are performed. Then, the state of "already paired" is a concept indicating a state in which encryption reestablishment for reestablishing a secure connection by using the encryption key can be performed by saving the encryption key by both the apparatuses after the completion of the bonding.

According to the above-described exemplary embodiment, the information associated with the pairing information is not limited to the information related to the name data or the network connection based on Wi-Fi®. For example, the information may be information obtained by combining the first exemplary embodiment with the second exemplary embodiment or other information.

According to the above-described exemplary embodiment, the communication apparatus 151 saves the PIN code, the identification information obtained from the information processing apparatus 101, the information such as the link key shared with the information processing apparatus 101 in the memory, for example. These pieces of information may be respectively saved in different memories.

According to the above-described exemplary embodiment, the change of the PIN code is executed by the operation with respect to the communication apparatus 151, but the configuration is not limited to this mode. For example, according to a function called remote UI, the PIN code can be changed by inputting the setting of the communication apparatus 151 to the screen displayed on the information processing apparatus 101. In a case where the PIN code held in the communication apparatus 151 is changed by the operation with respect to the information processing apparatus 101, for example, a mode may be adopted in which the pairing information shared with the information processing apparatus 101 that has performed the change of the PIN code is held instead of the deletion.

In addition, according to the above-described exemplary embodiment, in a case where the reset processing is executed, the mode has been described in which the information obtained at the time of the pairing executed before the execution of the reset processing is deleted from the memory and the display screen of the already authenticated apparatus, but the configuration is not limited to this mode. For example, a timing when the information obtained at the time of the pairing executed before the execution of the reset processing is deleted is not particularly limited. For example, a mode may also be adopted in which, after the reset processing, the above-described information is deleted at a timing when the power source of the communication apparatus 151 is turned off. In addition, for example, a mode may be adopted in which the information of the apparatus authenticated by the pairing executed before the execution of the reset processing is greyed out on the display screen instead of the mode in which the information is deleted from the display screen. That is, control may be performed such that the user does not select the information of the apparatus authenticated by the pairing executed before the execution of the reset processing, and the user operation for deleting the information and the user operation for checking the detail of the information are not accepted.

The above-described exemplary embodiment is also realized by executing the following processing. That is, software (program) for realizing the function of the above-described exemplary embodiment is supplied to a system or an apparatus via a network or various storage media, and a computer (such as a CPU or an MPU) of the system or the apparatus reads out and executes the program according to the processing. The program may be executed by a single computer or may also be executed by a plurality of computers in conjunction with each other. All of the above-described processes do not necessarily need to be realized by the software, and part or all of the processes may be realized by hardware such as ASIC. In addition, the CPU is not also limited to the single CPU that performs all the processes, and a plurality of CPUs may appropriately perform the processes in conjunction with each other.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-128954 filed Jun. 30, 2017, which is hereby incorporated by reference herein in its entirety.

What is claimed is:

1. A communication apparatus comprising:
   a communication unit configured to perform a communication based on a predetermined communication method;
   an authentication unit configured to execute authentication processing for authenticating an information processing apparatus by using authentication information as a specific apparatus that is permitted to perform a predetermined communication with the communication apparatus based on the predetermined communication method, wherein the authentication processing is executed based on specifications of the predetermined communication method;
   a display unit configured to display a display screen including identification information for identifying the information processing apparatus authenticated by the authentication processing as the specific apparatus, wherein the identification information is not information set to be obtained by the communication apparatus in the authentication processing based on the specifications of the predetermined communication method;
   an execution unit configured to execute change processing for changing contents of the authentication information; and
   a control unit configured to perform, in a case where the change processing is executed, control such that the identification information for identifying the information processing apparatus authenticated as the specific apparatus by the authentication processing executed before the execution of the change processing is not included in the display screen.

2. The communication apparatus according to claim 1, further comprising a reset unit configured to execute, in a case where the change processing is executed, reset processing for putting the information processing apparatus authenticated as the specific apparatus by the authentication processing executed before the execution of the change processing into an unauthenticated state as the specific apparatus.

3. The communication apparatus according to claim 1, further comprising:
   a saving unit configured to save the identification information in a memory; and
   a deletion unit configured to delete, in a case where the change processing is executed, the identification information obtained from the information processing apparatus authenticated as the specific apparatus by the authentication processing executed before the execution of the change processing from the memory.

4. The communication apparatus according to claim 1, further comprising:
   a presentation unit configured to present the authentication information to a user,
   wherein, in a case where the contents of the authentication information are changed by the change processing, the authentication information including the contents after the change is presented to the user.

5. The communication apparatus according to claim 1, further comprising:

a saving unit configured to save information generated in the authentication processing in a memory; and a deletion unit configured to delete the information generated in the authentication processing executed before the execution of the change processing from the memory.

6. The communication apparatus according to claim 5, wherein the information generated in the authentication processing includes a link key shared with the information processing apparatus authenticated by the authentication processing.

7. The communication apparatus according to claim 1, wherein the information set to be obtained in the authentication processing based on the standards of the predetermined communication method is a MAC address of the information processing apparatus authenticated by the authentication processing.

8. The communication apparatus according to claim 1, further comprising:
an acceptance unit configured to accept a selection of at least one piece of the identification information by a user from at least one piece of the identification information included in the display screen; and
a display control unit configured to perform, in a case where the selection is accepted, control such that the at least one piece of the identification information selected by the user is not included in the display screen.

9. The communication apparatus according to claim 8, further comprising:
a saving unit configured to save the at least one piece of the identification information obtained by at least one information processing apparatus in a memory; and
a deletion unit configured to delete, in a case where the selection is accepted, the at least one piece of the identification information selected by the user from the memory.

10. The communication apparatus according to claim 1, further comprising:
an information obtaining unit configured to obtain information related to a communication based on another communication method different from the predetermined communication method by the communication based on the predetermined communication method with the information processing apparatus authenticated as the specific apparatus by the authentication processing;
a connection unit configured to connect, based on the information related to the communication based on the another communication method, another apparatus different from the information processing apparatus to the communication apparatus by the another communication method; and
a cancelling unit configured to cancel, in a case where the change processing is executed, a connection between the communication apparatus and the another apparatus based on the obtained information related to the communication based on the another communication method by the communication based on the predetermined communication method with the information processing apparatus authenticated as the specific apparatus by the authentication processing executed before the execution of the change processing.

11. The communication apparatus according to claim 10, further comprising:

a saving unit configured to save the obtained information related to the communication based on the another communication method in a memory; and
a deletion unit configured to delete, in a case where the change processing is executed, the obtained information related to the communication based on the another communication method from the memory by the communication based on the predetermined communication method with the information processing apparatus authenticated as the specific apparatus by the authentication processing executed before the execution of the change processing.

12. The communication apparatus according to claim 1, further comprising:
a transmission unit configured to transmit information related to a communication based on another communication method different from the predetermined communication method by a communication based on the predetermined communication method with the information processing apparatus authenticated as the specific apparatus by the authentication processing;
a connection unit configured to connect the information processing apparatus to the communication apparatus by the another communication method based on the transmitted information related to the communication based on the another communication method; and
a cancellation unit configured to cancel, in a case where the change processing is executed, the connection based on the another communication method between the communication apparatus and the information processing apparatus authenticated as the specific apparatus by the authentication processing executed before the execution of the change processing.

13. The communication apparatus according to claim 12, wherein connection information saved in a memory is transmitted to the information processing apparatus authenticated as the specific apparatus by the authentication processing, and
wherein contents of the connection information saved in the memory are changed in a case where the change processing is executed.

14. The communication apparatus according to claim 1, wherein the identification information is information that can be changed by the user.

15. The communication apparatus according to claim 1, wherein the authentication processing is executed in a case where the identification information in conformity to a predetermined rule is transmitted by the information processing apparatus based on the predetermined communication method.

16. The communication apparatus according to claim 1, wherein the predetermined communication method is Bluetooth® Low Energy.

17. The communication apparatus according to claim 16, wherein the authentication processing is pairing processing based on Bluetooth® Low Energy.

18. The communication apparatus according to claim 1, further comprising an image forming unit configured to form an image on a recording medium.

19. A control method for a communication apparatus, the control method comprising:
performing a communication based on a predetermined communication method;
executing authentication processing for authenticating an information processing apparatus as a specific apparatus that is permitted to perform a predetermined communication based on the predetermined communication method with the communication apparatus by using authentication information, wherein the authentication processing is executed based on a specifications of the predetermined communication method;
displaying a display screen including identification information for identifying the information processing apparatus authenticated by the authentication processing as the specific apparatus, wherein the identification information is not information set to be obtained by the communication apparatus in the authentication processing on a basis of the specifications of the predetermined communication method;
executing changing processing for changing contents of the authentication information; and
performing, in a case where the change processing is executed, control such that the identification information for identifying the information processing apparatus authenticated as the specific apparatus by the authentication processing executed before the execution of the change processing is not included in the display screen.

20. A communication apparatus comprising:
a communication unit configured to perform a communication based on a predetermined communication method;
an authentication unit configured to perform authentication processing for authenticating an information processing apparatus as a specific apparatus that is permitted to perform a predetermined communication based on the predetermined communication method with the communication apparatus by using authentication information, wherein the authentication processing is executed by using specifications of the predetermined communication method;
a display unit configured to display a display screen including identification information obtained from the information processing apparatus authenticated as the specific apparatus by the authentication processing, wherein the identification information is not information set to be obtained by the communication apparatus in the authentication processing based on the specifications of the predetermined communication method;
an execution unit configured to execute change processing for changing contents of the authentication information;
a control unit configured to perform, in a case where the change processing is executed, control such that the identification information for identifying the information processing apparatus authenticated as the specific apparatus by the authentication processing executed before the execution of the change processing is not included in the display screen; and
an image forming unit configured to form an image on a recording medium.

* * * * *